(12) United States Patent
Aiba et al.

(10) Patent No.: US 12,075,385 B2
(45) Date of Patent: Aug. 27, 2024

(54) USER EQUIPMENTS, BASE STATIONS AND METHODS FOR SIDELINK CHANNEL STATE INFORMATION (SL CSI) REPORTING

(71) Applicants: SHARP KABUSHIKI KAISHA, Osaka (JP); FG Innovation Company Limited, Tuen Mun (HK)

(72) Inventors: Tatsushi Aiba, Osaka (JP); John Michael Kowalski, Vancouver, WA (US); Kazunari Yokomakura, Osaka (JP)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 449 days.

(21) Appl. No.: 17/421,501

(22) PCT Filed: Jan. 7, 2020

(86) PCT No.: PCT/JP2020/000168
§ 371 (c)(1),
(2) Date: Jul. 8, 2021

(87) PCT Pub. No.: WO2020/145267
PCT Pub. Date: Jul. 16, 2020

(65) Prior Publication Data
US 2022/0095277 A1  Mar. 24, 2022

Related U.S. Application Data

(60) Provisional application No. 62/790,356, filed on Jan. 9, 2019.

(51) Int. Cl.
*H04W 72/02* (2009.01)
*H04W 72/044* (2023.01)
(Continued)

(52) U.S. Cl.
CPC ......... *H04W 72/02* (2013.01); *H04W 72/044* (2013.01); *H04W 72/20* (2023.01); *H04W 72/542* (2023.01)

(58) Field of Classification Search
None
See application file for complete search history.

(56) References Cited

U.S. PATENT DOCUMENTS

| 2014/0315541 | A1 | 10/2014 | Lu et al. | |
| 2019/0174530 | A1* | 6/2019 | Kim | H04W 72/12 |
| 2021/0219292 | A1* | 7/2021 | Wang | H04W 72/23 |

OTHER PUBLICATIONS

Samsung, Discussion on Physical Layer Procedures[online], 3GPP TSG RAN WG1 #95, Nov. 16, 2018, R1-1812985, [retrieved on Mar. 5, 2023], Retrieved from the Internet :<URL:http://www.3gpp.org/ftp/tsg_ran/WG1_RL1/TSGR1_95/ Docs/R1-1812985.zip>.

(Continued)

*Primary Examiner* — Minh Trang T Nguyen
(74) *Attorney, Agent, or Firm* — ScienBiziP, P.C.

(57) ABSTRACT

A user equipment (UE) that performs sidelink (SL) communications is described. The UE includes receiving circuitry configured to: receive a first radio resource control (RRC) message comprising first information used for configuring an SL bandwidth part (SL BWP). The receiving circuitry is also configured to receive a second RRC message comprising second information used for configuring one or more resource pools for SL transmission within the SL BWP. The receiving circuitry is further configured to receive a third RRC message comprising third information used for configuring a sidelink channel state information-reference signal (SCSI-RS). The UE also includes transmitting circuitry configured to perform SL channel state information (CSI) reporting based on the third information. The third information is associated with at least one of the SL (Continued)

BWP and one resource pool of the one or more resource pools for the SL transmission.

4 Claims, 14 Drawing Sheets

(51) Int. Cl.
*H04W 72/20* (2023.01)
*H04W 72/542* (2023.01)

(56) References Cited

OTHER PUBLICATIONS

Huawei, HiSilicon, Summary of AI: 7.2.4.3 åUu-based sidelink resource allocation/configuration[online], 3GPP TSG RAN WG1 #94, Aug. 24, 2018, R1-1809878, [retrieved on Mar. 5, 2020], Retrieved from the Internet :<URL:http://www.3gpp.org/ftp/tsg_ran/WG1_RL1/TSGR1_94/Docs/R1-1809878.zip>.

Ericsson, Physical layer structure for Sl Nr V2X[online], 3GPP TSG RAN WG1 #95, 2018.11.16, R1-1813638, [retrieved on Mar. 5, 2020], Retrieved from the Internet:<URL:http://www.3gpp.org/ftp/tsg_ran/WG1_RL1/TSGR1_95/Docs/R1-1813638.zip>.

* cited by examiner

USER EQUIPMENTS, BASE STATIONS AND METHODS FOR SIDELINK CHANNEL STATE INFORMATION (SL CSI) REPORTING

CROSS-REFERENCE TO RELATED APPLICATION(S)

This Nonprovisional application claims the benefit of and priority under 35 U.S.C. § 119 to the provisional U.S. Patent Application Ser. No. 62/790,356, filed on Jan. 9, 2019, the entire content of which is hereby incorporated herein by reference.

TECHNICAL FIELD

The present disclosure relates generally to communication systems. More specifically, the present disclosure relates to user equipments, base stations and methods for sidelink channel state information (SL CSI) reporting.

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility, and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

SUMMARY

In one example, a user equipment that performs sidelink (SL) communications comprising: receiving circuitry configured to: receive a first radio resource control (RRC) message comprising first information used for configuring an SL bandwidth part (SL BWP); receive a second RRC message comprising second information used for configuring one or more resource pools for SL transmission within the SL BWP; and receive a third RRC message comprising third information used for configuring a sidelink channel state information-reference signal (SCSI-RS); and transmitting circuitry configured to perform SL channel state information (CSI) reporting based on the third information, wherein the third information is associated with at least one of the SL BWP and one resource pool of the one or more resource pools for the SL transmission.

In one example, a base station apparatus comprising: transmitting circuitry configured to: transmit a first radio resource control (RRC) message comprising first information used for configuring a sidelink (SL) bandwidth part (SL BWP); transmit a second RRC message comprising second information used for configuring one or more resource pools for SL transmission within the SL BWP; and transmit a third RRC message comprising third information used for configuring sidelink channel state information-reference signal (SCSI-RS), wherein SL channel state information (CSI) reporting is performed based on the third information, and the third information is associated with at least one of the SL BWP and one resource pool of the one or more resource pools for the SL transmission.

In one example, a communication method of a user equipment that performs sidelink (SL) communications comprising: receiving a first radio resource control (RRC) message comprising first information used for configuring an SL bandwidth part (SL BWP); receiving a second RRC message comprising second information used for configuring one or more resource pools for SL transmission within the SL BWP; receiving a third RRC message comprising third information used for configuring a sidelink channel state information-reference signal (SCSI-RS); and performing SL channel state information (CSI) reporting based on the third information, wherein the third information is associated with at least one of the SL BWP and one resource pool of the one or more resource pools for the SL transmission.

In one example, a communication method of a base station apparatus comprising: transmitting a first radio resource control (RRC) message comprising first information used for configuring a SL bandwidth part (SL BWP); transmitting a second RRC message comprising second information used for configuring one or more resource pools for SL transmission within the SL BWP; transmitting a third RRC message comprising third information used for configuring sidelink channel state information-reference signal (SCSI-RS), wherein SL channel state information (CSI) reporting is performed based on the third information, and the third information is associated with at least one of the SL BWP and one resource pool of the one or more resource pools for the SL transmission.

DESCRIPTION OF EMBODIMENTS

Figure 1:
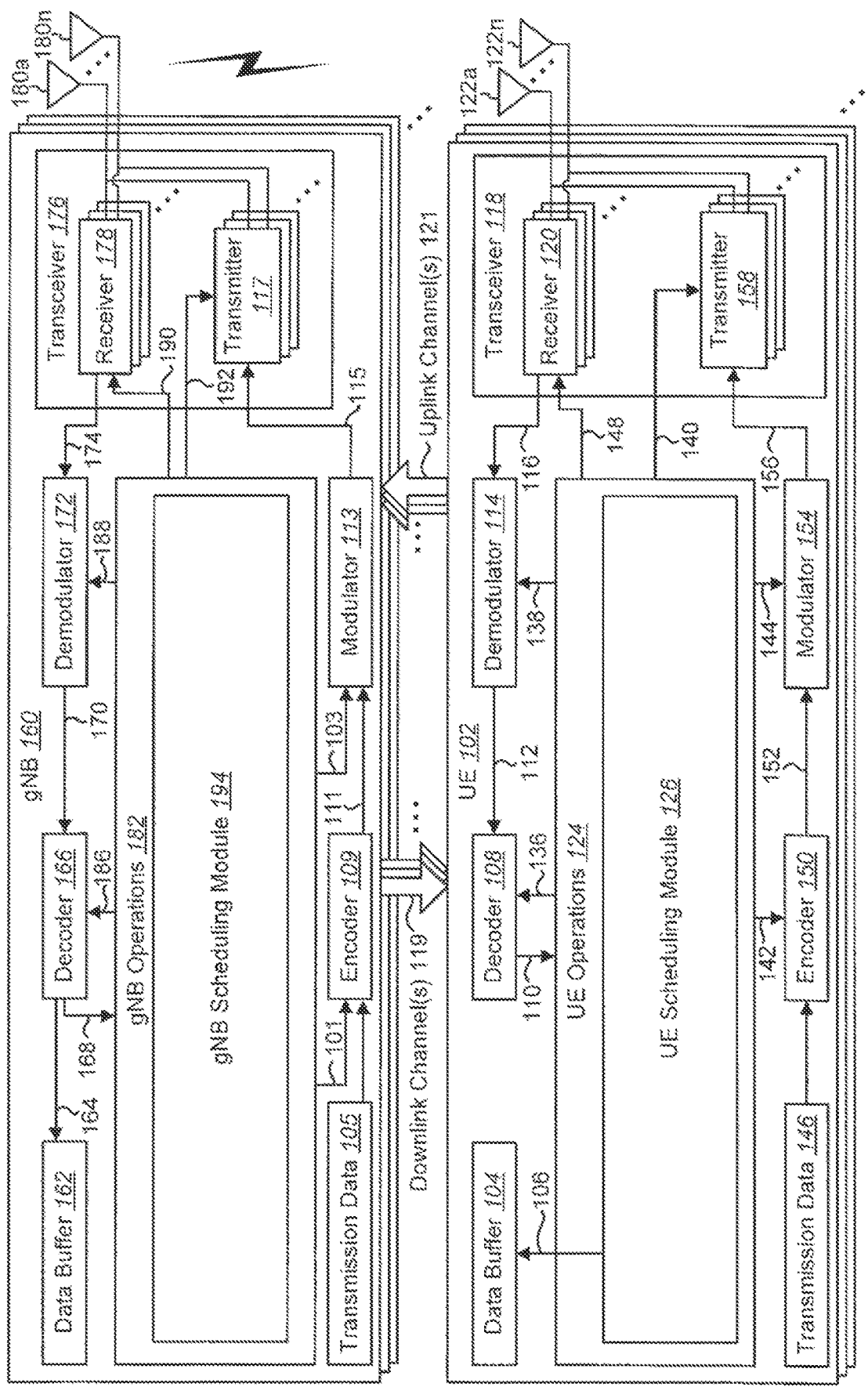
FIG. 1 is a block diagram illustrating one implementation of one or more base stations (e.g., next generation node Bs (gNBs)) and one or more user equipments (UEs) in which configurations for Vehicle-to-Everything (V2X) communication may be implemented.

A user equipment (UE) that performs a sidelink (SL) communication(s) is described. The UE includes receiving circuitry configured to receive a radio resource control (RRC) message that includes first information used for configuring a SL bandwidth part (SL BWP). The receiving circuitry is also configured to receive an RRC message that includes second information used for configuring one or more resource pools for SL transmission(s) within the SL BWP. The receiving circuitry is further configured to receive an RRC message that includes third information used for configuring a sidelink channel state information-reference signal (SCSI-RS). The UE also includes transmitting circuitry configured to perform SL CSI reporting based on the third information. The third information is associated with the SL BWP and/or one resource pool of the one or more resource pools for the SL transmission(s).

A base station apparatus (gNB) is also described. The gNB includes transmitting circuitry configured to transmit an RRC message that includes first information used for configuring an SL BWP. The transmitting circuitry is also configured to transmit an RRC message that includes second information used for configuring one or more resource pools for SL transmission(s) within the SL BWP. The transmitting circuitry is also configured to transmit an RRC message that includes third information used for configuring an SCSI-RS. SL CSI reporting is performed based on the third information. The third information is associated with the SL BWP and/or one resource pool of the one or more resource pools for the SL transmission(s).

A communication method of a UE that performs an SL communication(s) is also described. The method includes receiving an RRC message that includes first information used for configuring an SL BWP. The method also includes receiving an RRC message that includes second information used for configuring one or more resource pools for SL transmission(s) within the SL BWP. The method further includes receiving an RRC message that includes third information used for configuring a sidelink channel state information-reference signal (SCSI-RS). The method additionally includes performing SL CSI reporting based on the third information. The third information is associated with the SL BWP and/or one resource pool of the one or more resource pools for the SL transmission(s).

A communication method of a gNB is also described. The method includes transmitting an RRC message that includes first information used for configuring an SL BWP. The method also includes transmitting an RRC message that includes second information used for configuring one or more resource pools for SL transmission(s) within the SL BWP. The method further includes transmitting an RRC message comprising third information used for configuring SCSI-RS. SL CSI reporting is performed based on the third information. The third information is associated with the SL BWP and/or one resource pool of the one or more resource pools for the SL transmission(s).

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device." A UE may also be more generally referred to as a terminal device.

In 3GPP specifications, a base station is typically referred to as a Node B, an evolved Node B (eNB), a home enhanced or evolved Node B (HeNB) or some other similar terminology. As the scope of the disclosure should not be limited to 3GPP standards, the terms "base station," "Node B," "eNB," "gNB" and/or "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. An eNB may also be more generally referred to as a base station device.

Fifth generation (5G) cellular communications (also referred to as "New Radio," "New Radio Access Technology" or "NR" by 3GPP) envisions the use of time, frequency, and/or space resources to allow for enhanced mobile broadband (eMBB) communication and ultra-reliable low-latency communication (URLLC) services, such as eMBB (enhanced Mobile Broad-Band), URLLC (Ultra Reliable and Low Latency Communication), eMTC (massive Machine Type Communication), and/or V2X (Vehicle-to-Everything) communication. For example, in V2X communication, wireless communication devices may communicate with one or more devices using communication resources. A new radio (NR) base station may be referred to as a gNB. A gNB may also be more generally referred to as a base station device.

However, the communication resources used may only offer limited flexibility and/or efficiency. As illustrated by this discussion, apparatus, systems and methods that improve communication flexibility and/or efficiency may be beneficial.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one implementation of one or more base stations (gNBs) 160 and one or more user equipments (UEs) 102 in which configurations for V2X communication may be implemented. The one or more UEs 102 communicate with one or more gNBs 160 using one or more antennas 122a-n. For example, a UE 102 transmits electromagnetic signals to the gNB 160 and receives electromagnetic signals from the gNB 160 using the one or more antennas 122a-n. The gNB 160 communicates with the UE 102 using one or more antennas 180a-n.

The UE 102 and the gNB 160 may use one or more channels 119, 121 to communicate with each other. For example, a UE 102 may transmit information or data to the gNB 160 using one or more uplink channels 121. Examples of uplink channels 121 include a PUCCH (Physical Uplink Control Channel) and a PUSCH (Physical Uplink Shared Channel), a PRACH (Physical Random Access Channel), etc. For example, uplink channels 121 (e.g., the PUSCH) may be used for transmitting UL data (i.e., TB(s) (Transport Block(s)), MAC (Medium Access Control) PDU, and/or UL-SCH (Uplink-Shared Channel)).

Also, for example, uplink channels 121 may be used for transmitting Hybrid Automatic Repeat Request-ACK (HARQ-ACK), Channel State Information (CSI), and/or Scheduling Request (SR). The HARQ-ACK may include information indicating a positive acknowledgment (ACK) and/or a negative acknowledgment (NACK) for DL data (i.e., TB (s), MAC PDU, and/or DL-SCH (Downlink-Shared Channel)).

The CSI may include information indicating a channel quality of downlink. The CSI may include one or more of CQI (channel quality indicator), PMI (precoding matrix indicator), RI (rank indicator), LI (layer indicator), and/or CRI (CSI-RS index). The SR may be used for requesting UL-SCH (Uplink-Shared Channel) resources for new transmission and/or retransmission. Namely, the SR may be used for requesting UL resources for transmitting UL data. Here, the HARQ-ACK, the CSI, and/or the SR may be included in UCI (Uplink Control Information).

The one or more gNBs 160 may also transmit information or data to the one or more UEs 102 using one or more downlink channels 119, for instance. Examples of downlink channels 119 include a PDCCH (Physical Downlink Control Channel), a PDSCH (Physical Downlink Shared Channel), etc. Other kinds of channels may be used. The PDCCH may be used for transmitting Downlink Control Information (DCI). The PDSCH may be used for transmitting the DL data.

Each of the one or more UEs 102 may include one or more transceivers 118, one or more demodulators 114, one or more decoders 108, one or more encoders 150, one or more modulators 154, a data buffer 104 and a UE operations module 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals from the gNB 160 using one or more antennas 122a-n. For example, the receiver 120 may receive and downconvert signals to produce one or more received signals 116. The one or more received signals 116 may be provided to a demodulator 114. The one or more transmitters 158 may transmit signals to the gNB 160 using one or more antennas 122a-n. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce decoded signals 110, which may include a UE-decoded signal 106 (also referred to as a first UE-decoded signal 106). For example, the first UE-decoded signal 106 may comprise received payload data, which may be stored in a data buffer 104. Another signal included in the decoded signals 110 (also referred to as a second UE-decoded signal 110) may comprise overhead data and/or control data. For example, the second UE decoded signal 110 may provide data that may be used by the UE operations module 124 to perform one or more operations.

In general, the UE operations module 124 may enable the UE 102 to communicate with the one or more gNBs 160. The UE operations module 124 may include a UE scheduling module 126.

In LTE V2X, a basic set of requirements for V2X service is supported, which are considered sufficient for basic road safety service. An LTE V2X-enabled vehicle (e.g., a vehicle configured with a UE 102 that supports V2X applications) can directly exchange status information via a PC5 interface. It should be noted that sidelink (SL) may define the procedures for realizing a single-hop UE-UE communication, similar to Uplink and Downlink, which define the procedures for a UE-base station (BS) and BS-UE access, respectively. Along the same lines, PC5 was introduced as the new direct UE interface, similar to the Uu (UE-BS and/or BS-UE) interface (i.e., uplink and/or downlink). Thus, the PC5 interface is also known as sidelink (SL) at the physical layer such as position, speed and heading, with other nearby vehicles, infrastructure nodes and/or pedestrians that are also enabled with LTE V2X.

New Radio (e.g., Rel-16 NR) provides higher throughput, lower latency and higher reliability as compared to LTE, via a combination of enchantments to protocol numerology, usage of higher frequency bands (e.g., millimeter (mm) Wave Frequencies) and a selection of wider sub carrier spacings (SCS) (e.g., 30 kHz, 60 kHz, 120 kHz, and/or 240 kHz, in addition to the 15 kHz used by LTE) to match the higher frequency bands, and a process for beam management (BM). New Radio (e.g., Rel-16 NR) is expected to provide an enhanced V2X service (also referred to as NR V2X) that leverages the higher throughput, lower latency and higher reliability provided by NR data transport services.

In NR, there are roughly two large frequency ranges specified in 3GPP. One is below 6 GHz (also referred to as sub 6 GHz or FR1). The other is above 6 GHz (also referred to as millimeter wave or FR2. Depending on the frequency ranges, the maximum bandwidth and subcarrier spacing varies. In FR1, the maximum bandwidth is 100 MHz and in the FR2 range the maximum bandwidth is 400 MHz. Some subcarrier spacing (e.g., 15 kHz and 30 kHz) can be used only in FR1 and some subcarrier spacing (e.g., 120 kHz and 240 kHz) can be used in FR2 only, and some subcarrier spacing (e.g., 60 kHz) can be used both in the FR1 and FR2 range.

For a radio link between a gNB 160 and a UE 102 (e.g., a first or a second UE 102), at least, the following physical channels may be used (e.g., downlink is a transmission direction from the gNB 160 to the UE 102, and uplink is a transmission direction from the UE 102 to the gNB 160): a PBCH (Physical Broadcast Channel); a PDCCH; a PDSCH; a PUCCH; and/or a PUSCH.

The PBCH may be used for broadcasting essential system information. Also, the PBCH may be used for carrying MIB (Master Information Block). Also, the PBCH may be used for carrying one or more SIB(s) (System Information Block(s)). The PDCCH may be used for transmitting the DCI in the downlink. The PDSCH may be used for transmitting the DL data. The PUCCH may be used for transmitting the UCI. The PUSCH may be used for transmitting the UL data and/or the UCI.

Also, the PDSCH may be used for transmitting RMSI (Remaining Minimum System Information), the SIB(s), and/or paging information. Also, the PDSCH and/or the PUSCH may be used for transmitting information of a higher layer (e.g., a RRC (Radio Resource Control) layer, and/or a MAC layer). For example, the PDSCH (e.g., from the gNB 160 to the UE 102) and/or the PUSCH (e.g., from the UE 102 to the gNB 160) may be used for transmitting an RRC message (an RRC signal). Also, the PDSCH (e.g., from the gNB 160 to the UE 102) and/or the PUSCH (e.g., from the UE 102 to the gNB 160) may be used for transmitting a MAC control element (a MAC CE). The RRC message and/or the MAC CE may also be referred to as a higher layer signal. The RRC message may include the MIB, the SIB(s), a common RRC message, and/or a dedicated RRC message.

Also, for the radio link between a gNB 160 and a UE 102 (e.g., a first or a second UE 102), at least the following physical signals may be used: PSS (Primary Synchronization Signal); SSS (Secondary Synchronization Signal); CSI-RS (Channel State Information Reference Signal); and/or DMRS (Demodulation Reference Signal).

The PSS and/or the SSS may be used for time and/or frequency synchronization. Also, the PSS and/or the SSS may be used for determination and/or detection of a physical cell identity (PCID). The PSS, the SSS, the PBCH, and/or the DMRS for the PBCH may be multiplexed as an SS/PBCH block, and one or more SS/PBCH blocks may be transmitted in the downlink. The CSI-RS may be used for measuring the CSI for the downlink and transmitted in the downlink. The CSI-RS may be non-zero power CSI-RS for channel measurement and/or interference measurement. Also, the CSI-RS may be zero-power CSI-RS (ZP CSI-RS) for interference measurement. The DMRS may be used for demodulation of downlink and/or uplink physical channels, and the DMRS may be defined for each downlink and/or uplink physical channel.

Also, for SL communication(s) (i.e., SL transmission(s) and/or SL reception(s)), at least the following physical channels may be defined: a PSBCH (Physical SL Broadcast Channel); a PSCCH (Physical SL Control Channel); a PSSCH (Physical SL Shared Channel); and/or a PSFCH (Physical SL Feedback Channel).

The PSBCH may be used for carrying information on an SL frame number, and so on. The PSCCH may be used for transmitting SCI (SL Control Information). The SCI may be used for scheduling of the PSSCH and/or the PSFCH. For example, the SCI (e.g., the SCI format(s)) may include frequency and/or time domain resource (e.g., a resource pool(s), a resource(s) within a resource pool(s)) assignment for the PSSCH. Also, the SCI (e.g., the SCI format(s)) may include modulation and coding schemes (MCS) for the PSSCH. Also, the SCI (e.g., the SCI format(s)) may be used for indicating a resource for the PSFCH (e.g., a position(s) of the PSFCH). Here, as described below, more than one SCI formats may be defined for the SL communication(s).

The PSSCH may be used for transmitting SL data (i.e., TB (s), MAC PDU, and/or SL-SCH (Sidelink-Shared Channel)) and/or SFCI (SL Feedback Control Information). The SL data may include V2X data. Also, the PSSCH may be used for transmitting the higher layer signal (e.g., the RRC message and/or the MAC control element (CE)). The PSFCH may be used for transmitting the SFCI.

The SFCI may include HARQ-ACK (e.g., HARQ-ACK for the PSSCH) and/or CSI (e.g., CSI for an SL (i.e., a channel between a transmitter UE-1 and a receiver UE-2, as described below)). The HARQ-ACK (e.g., the HARQ-ACK for the PSSCH) may be described as SL HARQ-ACK (e.g., SL HARQ feedback). Also, the CSI (e.g., the CSI for the SL) may be described as SL CSI. The SL CSI may include CQI, PMI, RI, RSRP (Reference Signal Received Power), RSRQ (Reference Signal Received Quality), path gain/pathloss, SRI (SRS (Sounding Reference Signal) Resource Indicator), CRI (CSI-RS Resource Indicator), interference condition, and/or vehicle motion.

Also, for SL communication(s), the following physical signals may be defined: PSSS (Primary SL Synchronization Signal); SSSS (Secondary SL Synchronization Signal); SCSI-RS (SL Channel State Information Reference Signal); SDMRS (SL Demodulation Reference Signal).

The PSSS and/or the SSSS may be used for time and/or frequency synchronization. Also, the PSSS and/or the SSSS may be used for determination and/or detection of a synchronization source identity (ID). The PSSS, the SSSS, the PSBCH, and/or the DMRS for the PSBCH may be multiplexed as an SSS/PSBCH block, and one or more SSS/PSBCH blocks may be transmitted in the SL. The SCSI-RS may be used for measuring the CSI for the SL and transmitted in the SL. The SCSI-RS may be non-zero power SCSI-RS for channel measurement and/or interference measurement. Also, the SCSI-RS may be zero-power SCSI-RS (ZP SCSI-RS) for interference measurement. The SDMRS may be used for demodulation of physical channels, and the SDMRS may be defined for each SL physical channel.

Here, in this disclosure, unless otherwise noted, the size of various fields in the time domain is expressed in time units $T_C=1/(\Delta f_{max} \cdot N_f)$ where $\Delta f_{max}=480 \cdot 10^3$ Hz and $N_f=4096$. The constant $\kappa=T_S/T_C=64$, where $T_S=1/(\Delta f_{ref} \cdot N_{f,ref})$, $\Delta f_{ref}=15 \cdot 10^3$ Hz and $N_{f,ref}=2048$.

Multiple OFDM numerologies (e.g., subcarrier spacings and/or cyclic prefixes) are supported, as given by Table 1 where µ and the cyclic prefix for a bandwidth part are obtained from the higher-layer parameter subcarrier-Spacing and cyclicPrefix, respectively. Here, numerologies may be separately configured for DL MVP(s), UL RAT(s), and/or SL BWP(s).

TABLE 1

| μ | Δf = $2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For subcarrier spacing configuration μ, slots may be numbered $n_s^\mu \in \{0, \ldots, N_{slot}^{subframe,\mu}-1\}$ in increasing order within a subframe and $n_{s,f}^\mu \in \{0, \ldots, N_{slot}^{frame,\mu}-1\}$ in increasing order within a frame. There are $N_{symb}^{slot}$ consecutive OFDM symbols in a slot, where $N_{symb}^{slot}$ depends on the cyclic prefix as given by Tables 2 and 3, respectively. The start of slot $n_s^\mu$ in a subframe is aligned in time with the start of OFDM symbol $n_s^\mu N_{symb}^{slot}$ N the same subframe. Table 2 depicts the number of OFDM symbols per slot, slots per frame, and slots per subframe for normal cyclic prefix. Table 3 depicts the number of OFDM symbols per slot, slots per frame, and slots per subframe for extended cyclic prefix.

TABLE 2

| μ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 3

| μ | $N_{symb}^{slot}$ | $N_{slot}^{frame, \mu}$ | $N_{slot}^{subframe, \mu}$ |
|---|---|---|---|
| 2 | 12 | 40 | 4 |

OFDM symbols in a slot can be classified as "downlink", "flexible", "uplink", and/or "sidelink". In a slot in a downlink frame, the UE 102 may assume that downlink transmissions only occur in "downlink" or "flexible" symbols. In a slot in an uplink frame, the UE 102 may only transmit in "uplink" or "flexible" symbols. In a slot in a sidelink frame, the UE 102 may perform sidelink communication (i.e., transmission and/or reception) in "sidelink" symbols.

For each numerology and carrier, a resource grid of $N_{grid,x}^{size,\mu} N_{sc}^{RB}$ subcarriers and $N_{symb}^{subframe,\mu}$ OFDM symbols may be defined, starting at common resource block $N_{grid}^{start,\mu}$ indicated by higher-layer signaling. There may be one set of resource grids per transmission direction (uplink, downlink, or sidelink) with the subscript x set to DL, UL, and/or SL for downlink, uplink, and/or sidelink, respectively. When there is no risk for confusion, the subscript x may be dropped. There may be one resource grid for a given antenna port p, subcarrier spacing configuration μ, and transmission direction (downlink, uplink, and/or sidelink).

Each element in the resource grid for antenna port p and subcarrier spacing configuration μ is called a resource element and is uniquely identified by $(k,l)_{p,\mu}$ where k is the index in the frequency domain and l refers to the symbol position in the time domain relative to some reference point. Resource element $(k,l)_{p,\mu}$ corresponds to a physical resource and the complex value $a_{k,l}^{(p,\mu)}$.

When there is no risk for confusion, or no particular antenna port or subcarrier spacing is specified, the indices p and μ may be dropped, resulting in $a_{k,l}^{(p)}$ or $a_{k,l}$.

Point A is also described herein. A resource block is defined as $N_{sc}^{RB}=12$ consecutive subcarriers in the frequency domain. The point A serves as a common reference point for resource block grids and may be obtained from the following. offsetToPointA for a PCell downlink represents the frequency onset between point A and the lowest subcarrier of the lowest resource block overlapping with the SS/PBCH block (and/or the SSS/PSBCH block) used by the UP for initial cell selection, expressed in units of resource blocks assuming 15 kHz subcarrier spacing for FR1 and 60 kHz subcarrier spacing for FR2. absoluteFrequencyPointA for all other cases where absoluteFrequencyPointA represents the frequency-location of point A expressed as in ARFCN.

Common resource blocks are numbered from 0 and upwards in the frequency domain for subcarrier spacing configuration μ. The center of subcarrier 0 of common resource block 0 for subcarrier spacing configuration μ may coincide with point A. The relation between the common resource block number $n_{CRB}^\mu$ in the frequency domain and resource elements (k,l) for subcarrier spacing configuration μ may be given by $n_{CRB}^\mu = k/N_{sc}^{RB}$ where k is defined relative to point A such that k=0 corresponds to the subcarrier centered around point A.

Physical resource blocks may be defined within a bandwidth part and numbered from 0 to $B_{BWP,i}^{size}-1$ where i is the number of the bandwidth part. The relation between the physical resource block $n_{PRB}$ in bandwidth part i and the common resource block $n_{CRB}$ is given by $n_{CRB}=n_{PRB}+N_{BWP,i}^{start}$ where $N_{BWP,i}^{size}$ is the common resource block where bandwidth part starts relative to common resource block 0.

Virtual resource blocks may be defined within a bandwidth part and numbered from 0 to $N_{BWP,i}^{size}-1$. In this case, i is the number of the bandwidth part.

A bandwidth part is a subset of contiguous common resource blocks for a given numerology $\mu_i$ in bandwidth part i on a given carrier. The starting position $N_{BWP,i}^{start,\mu}$ and the number of resource blocks $N_{BWP,i}^{size,\mu}$ in a bandwidth part may fulfil $N_{grid,x}^{start,\mu} \leq N_{BWP,i}^{start,\mu} < N_{grid,x}^{start,\mu}+N_{grid,x}^{size,\mu}$ and $N_{grid,x}^{start,\mu} < N_{BWP,i}^{size,\mu}+N_{BWP,i}^{start,\mu} \leq N_{grid,x}^{start,\mu}+N_{grid,x}^{size,\mu}$, respectively.

The UE operations module 124 may provide information 148 to the one or more receivers 120. For example, the UE operations module 124 may inform the receiver(s) 120 when to receive retransmissions.

The UE operations module 124 may provide information 138 to the demodulator 114. For example, the UE operations module 124 may inform the demodulator 114 of a modulation pattern anticipated for transmissions from the gNB 160.

The UE operations module 124 may provide information 136 to the decoder 108. For example, the UE operations module 124 may inform the decoder 108 of an anticipated encoding for transmissions from the gNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include PDSCH HARQ-ACK information.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the gNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the gNB 160. For instance, the one or more transmitters 158 may transmit during a UL subframe. The one or more transmitters 158 may upconvert and transmit the modulated signal(s) 156 to one or more gNBs 160.

Each of the one or more gNBs 160 may include one or more transceivers 176, one or more demodulators 172, one or more decoders 166, one or more encoders 109, one or more modulators 113, a data buffer 162 and a gNB operations module 182. For example, one or more reception and/or transmission paths may be implemented in a gNB 160. For convenience, only a single transceiver 176, decoder 166, demodulator 172, encoder 109 and modulator 113 are illustrated in the gNB 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals from the UE 102 using one or more antennas 180a-n. For example, the receiver 178 may receive and downconvert signals to produce one or more received signals 174. The one or more received signals 174 may be provided to a demodulator 172. The one or more transmitters 117 may transmit signals to the UE 102 using one or more antennas 180a-n. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The gNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB-decoded signal 168 may provide data (e.g., PDSCH HARQ-ACK information) that may be used by the gNB operations module 182 to perform one or more operations.

In general, the gNB operations module 182 may enable the gNB 160 to communicate with the one or more UEs 102. The gNB operations module 182 may include a gNB scheduling module 194. The gNB scheduling module 194 may perform operations for V2X communication as described herein.

The gNB operations module 182 may provide information 188 to the demodulator 172. For example, the gNB operations module 182 may inform the demodulator 172 of a modulation pattern anticipated for transmissions from the UE(s) 102.

The gNB operations module 182 may provide information 186 to the decoder 166. For example, the gNB operations module 182 may inform the decoder 166 of an anticipated encoding for transmissions from the UE(s) 102.

The gNB operations module 182 may provide information 101 to the encoder 109. The information 101 may include data to be encoded and/or instructions for encoding. For example, the gNB operations module 182 may instruct the encoder 109 to encode information 101, including transmission data 105.

The encoder 109 may encode transmission data 105 and/or other information included in the information 101 provided by the gNB operations module 182. For example, encoding the data 105 and/or other information included in the information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The gNB operations module 182 may provide information 103 to the modulator 113. This information 103 may include instructions for the modulator 113. For example, the gNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The gNB operations module 182 may provide information 192 to the one or more transmitters 117. This information 192 may include instructions for the one or more transmitters 117. For example, the gNB operations module 182 may instruct the one or more transmitters 117 when to (or when not to) transmit a signal to the UE(s) 102. The one or more transmitters 117 may upconvert and transmit the modulated signal(s) 115 to one or more UEs 102.

It should be noted that a DL subframe may be transmitted from the gNB 160 to one or more UEs 102 and that a UL subframe may be transmitted from one or more UEs 102 to the gNB 160. Furthermore, both the gNB 160 and the one or more UEs 102 may transmit data in a standard special subframe.

It should also be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Figure 2:
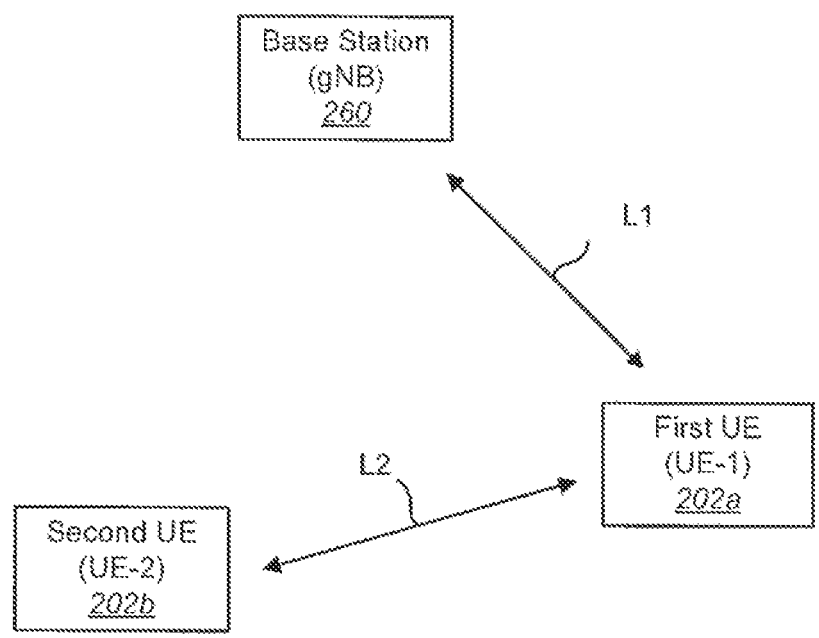
FIG. 2 is an example illustrating V2X services.

FIG. 2 is an example illustrating V2X services. A first UE 202a (referred to as a UE 102 or a transmitter UE-1) transmits the V2X data to a second UE 202b (referred to as a UE 102 or a receiver UE-2). A base station (gNB) 260 transmits the UE data or control signal(s) to the UE 102 (i.e., the first UE 202a and/or the second UE 202b). L1 is a radio link between gNB 260 and the first UE 202a (L1 may be called as Uu interface). Also, L2 is a radio link between first UE 202a and the second UE 202b (L2 may be called as PC5 interface (i.e., the SL)).

For example, the transmitter UE-1 may perform PSBCH transmission to the receiver UE-2. Also, the transmitter UE-1 may perform PSCCH transmission to the receiver UE-2. Also, the transmitter UE-1 may perform PSSCH transmission to the receiver 2. Also, the receiver UE-2 may perform PSFCH transmission to the transmitter UE-1. Also, the transmitter UE-1 and/or the receiver 2 may perform PSFCH transmission to the gNB 260. Also, the transmitter UE-1 may perform SSS/PSBCH block transmission to the receiver UE-2. Also, the transmitter UE-1 may perform SCSI-RS transmission to the receiver UE-2. Also, the transmitter UE-1 may perform SDMRS transmission associated with each SL physical channel to the receiver UE-2.

Figure 3:
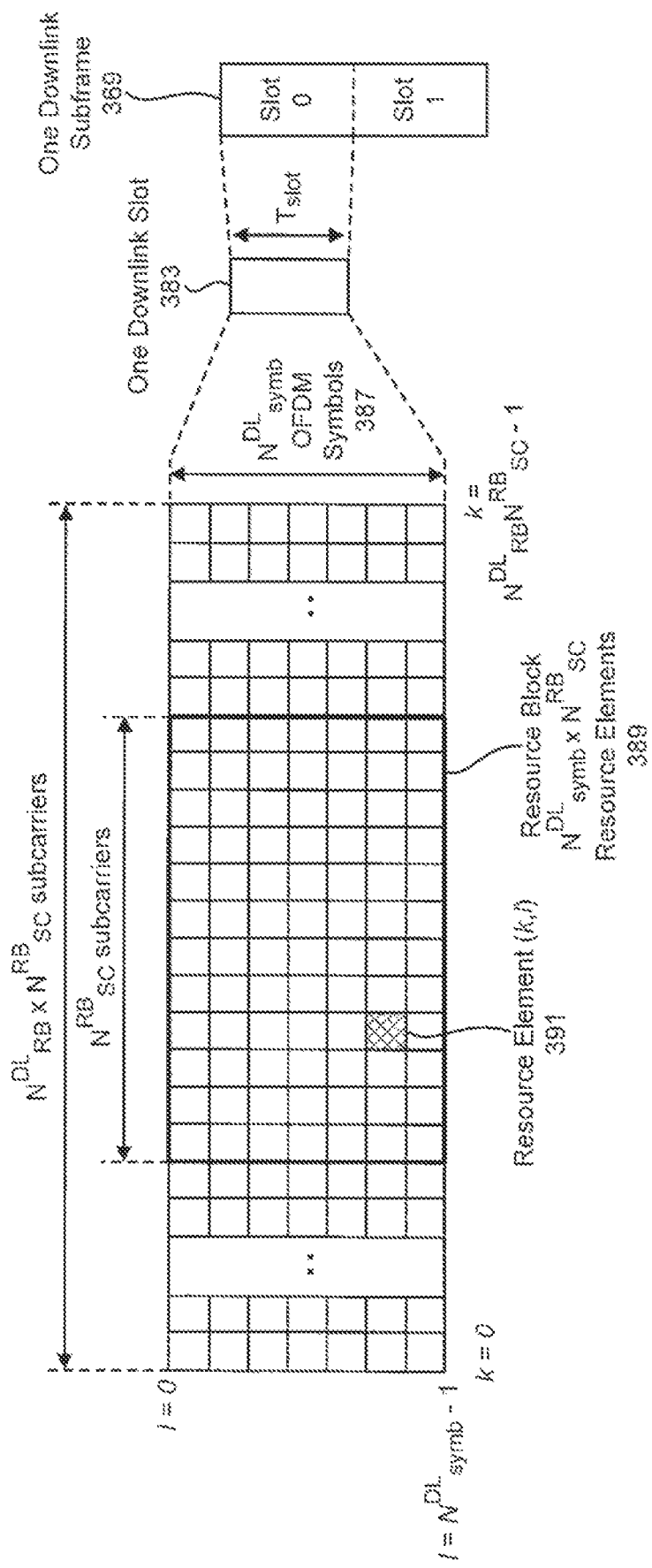
FIG. 3 is a diagram illustrating one example of a resource grid for the downlink.

FIG. 3 is a diagram illustrating one example of a resource grid for the downlink. The resource grid illustrated in FIG. 3 may be utilized in some implementations of the systems and methods disclosed herein. More detail regarding the resource grid is given in connection with FIG. 1.

In FIG. 3, one downlink subframe 369 may include two downlink slots 383. $N^{DL}_{RB}$ is downlink bandwidth configuration of the serving cell, expressed in multiples of $N^{RB}_{sc}$, where $N^{RB}_{sc}$ is a resource block 389 size in the frequency domain expressed as a number of sub-carriers, and $N^{DL}_{symb}$ is the number of OFDM symbols 387 in a downlink slot 383. A resource block 389 may include a number of resource elements (RE) 391, For a PCell, $N^{DL}_{RB}$ is broadcast as a part of system information. For an SCell (including an Licensed Assisted Access (LAA) SCell), $N^{DL}_{RB}$ is configured by a RRC message dedicated to a UE 102. For PDSCH mapping, the available RE 391 may be the RE 391 whose index 1 fulfils $1 \geq 1_{data,start}$ and $1_{data,end} \geq 1$ in a subframe.

In the downlink, the OFDM access scheme with cyclic prefix (CP) may be employed, which may be also referred to as CP-OFDM. A downlink frame may include multiple pairs of resource blocks (RBs) 389, which is also referred to as physical resource blocks (PRBs). The RB pair is a unit for assigning radio resources, defined by a predetermined bandwidth (i.e., RB bandwidth) and a time slot. The RB pair may include two RBs 389 that are continuous in the time domain. Additionally or alternatively, the RB 389 may include twelve sub-carriers in frequency domain and seven (for normal CP) or six (for extended CP) OFDM symbols in time domain. A region defined by one sub-carrier in frequency domain and one OFDM symbol in time domain may be referred to as a resource element (RE) 391 and may be uniquely identified by the index pair (k,l), where k and l are indices in the frequency and time domains, respectively. Here, the same structure as the downlink may be applied for the SL communication(s).

Figure 4:
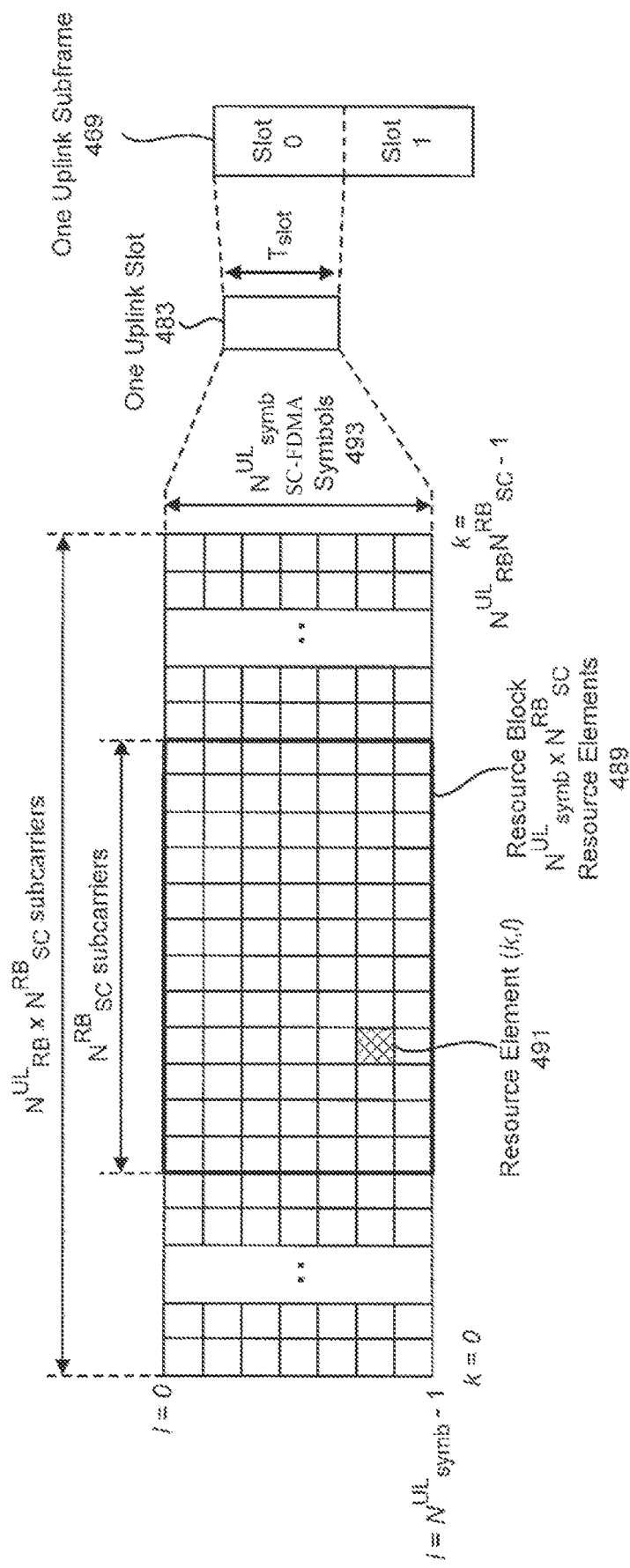
FIG. 4 is a diagram illustrating one example of a resource grid for the uplink.

FIG. 4 is a diagram illustrating one example of a resource grid for the uplink. The resource grid illustrated in FIG. 4 may be utilized in some implementations of the systems and methods disclosed herein. More detail regarding the resource grid is given in connection with FIG. 1.

In FIG. 4, one uplink subframe 469 may include two uplink slots 483. $N^{UL}_{RB}$ is uplink bandwidth configuration of the serving cell; expressed in multiples of $N^{RB}_{sc}$, where $N^{RB}_{sc}$ is a resource block 489 size in the frequency domain expressed as a number of subcarriers, and $N^{UL}_{symb}$ is the number of SC-FDMA symbols 493 in an uplink slot 483. A resource block 489 may include a number of resource elements (RE) 491.

For a PCell, $N^{UL}_{RB}$ broadcast as a part of system information. For an SCell (including an LAA $N^{UL}_{RB}$ is configured by a RRC message dedicated to a UE 102.

In the uplink, in addition to the CP-Orthogonal Frequency Division Multiplexing (OFDM), a Single-Carrier Frequency Division Multiple Access (SC-FDMA) access scheme may be employed, which is also referred to as Discrete Fourier Transform-Spreading OFDM (DFT-S-OFDM). An uplink radio frame may include multiple pairs of resource blocks 489. The RB pair is a unit for assigning radio resources, defined by a predetermined bandwidth (i.e., RB bandwidth) and a time slot. The RB pair may include two RBs 489 that are continuous in the time domain. The RB 489 may include twelve sub-carriers in frequency domain and seven (for normal CP) or six (for extended CP) OFDM/DFT-S-OFDM symbols in time domain. A region defined by one sub-carrier in the frequency domain and one OFDM/DFT-S-OFDM symbol in the time domain may be referred to as a resource element (RE) 491 and may be uniquely identified by the index pair (k,l) in a slot, where k and 1 are indices in the frequency and time domains respectively. The CP-OFDM may be defined as the case that transform precoding is not enabled and/or disabled. The DFT-S-OFDM may be defined as the case that transform precoding is enabled. Here, the same structure as the uplink may be applied for the SL communication(s). Also, the SL communication(s) may be performed in an uplink band(s) (e.g., an uplink frequency band(s)).

Figure 5:
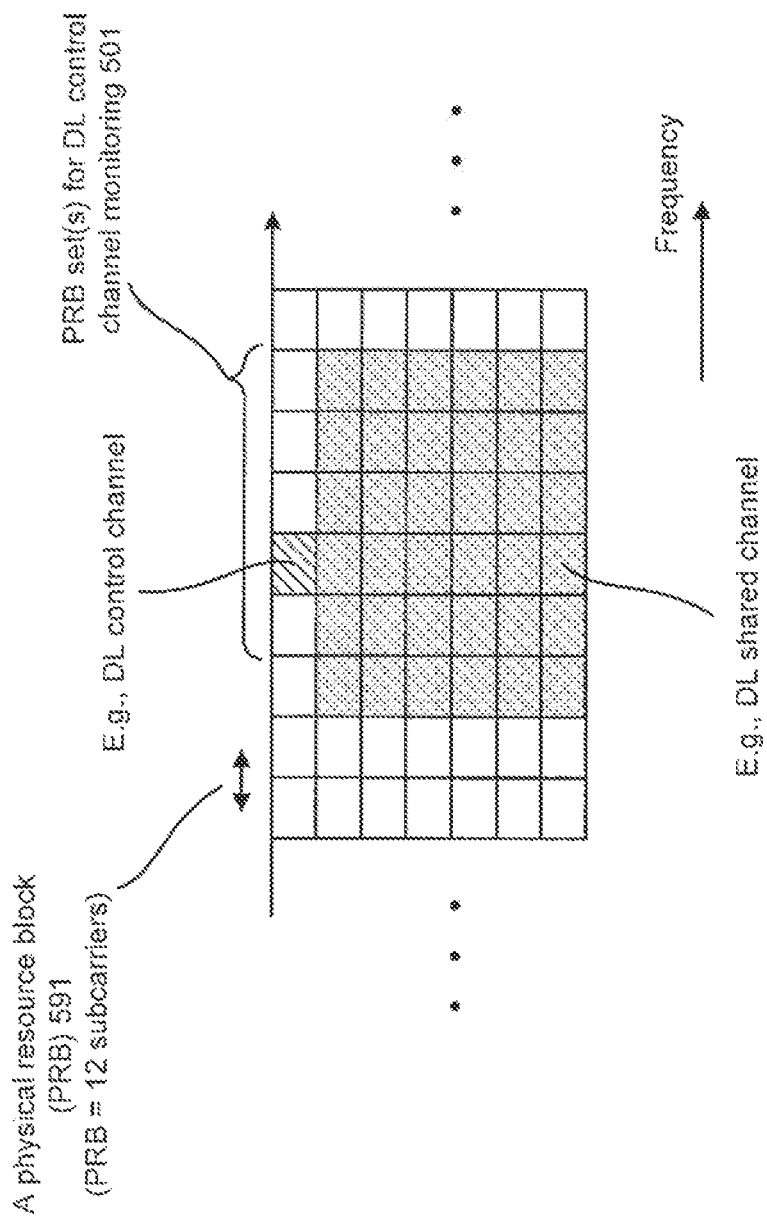
FIG. 5 shows examples of downlink (DL) and/or sidelink (SL) control channel monitoring regions.

FIG. 5 shows examples of downlink (DL) and/or sidelink (SL) control channel monitoring regions. The resource grid illustrated in FIG. 5 may be utilized in some implementations of the systems and methods disclosed herein. A physical resource block (PRB) 591 may include 12 subcarriers in the frequency domain.

One or more sets 501 of PRB(s) 591 may be configured for DL and/or SL control channel (i.e., PDCCH and/or PSCCH) monitoring. In other words, a control resource set is, in the frequency domain, a set 501 of PRBs 591 within which the UE 102 attempts to blindly decode the DCI and/or the SCI, where the PRBs 591 may or may not be frequency contiguous, a UE 102 may have one or more control resource sets, and one or more DCI messages and/or one or more SCI messages may be located within one control resource set.

As described above, the PDCCH may be used for transmitting the DCI used for scheduling of the PDSCH or the PUSCH may be defined. Here, more than one DCI format may be defined (e.g., configured by the gNB 160 to the UE 102) for DCI transmission on the PDCCH. Namely, fields may be defined in the DCI format, and the fields are mapped to the information bits (e.g., DCI bits). For example, a DCI format 1_0 and/or a DCI format 1_1 used for scheduling of the PDSCH may be defined. Also, a DCI format 0_0 and/or a DCI format 0_1 used for scheduling the PUSCH may be defined. For example, the DCI formats (e.g., the DCI format 1_0 and/or 1_1, the DCI format 0_0 and/or 0_1) may include frequency and/or time domain resource assignment for the PDSCH or the PUSCH. Also, the DCI format 2_1 that may be used for notifying the PRB(s) 591 and/or the OFDM symbol(s) where the UE 102 may assume no transmission in the DL and/or the UL is intended for the UE 102.

The gNB 160 may transmit, by using the RRC message, information used for configuring one or more RNTIs (Radio Network Temporary Identifier(s)) for transmission of the DCI (e.g., the DCI format(s), the PDCCH(s)). Namely, CRC (Cyclic Redundancy Check) parity bits (also referred to simply as CRC), which are generated based on the DCI, are attached to the DCI, and, after attachment, the CRC parity bits are scrambled by the RNTI(s). The UE 102 may attempt to decode (e.g., monitor, detect) the DCI to which the CRC parity bits scrambled by the RNTI(s) are attached. Namely, the UE 102 may detect the PDCCH(s) (e.g., the DCI format(s)) based on the blind decoding.

That is, the UE 102 may decode the PDCCH(s) with the CRC scrambled by the RNTI(s). In other words, the UE 102 may monitor the PDCCH(s) with the RNTI(s). Here, the UE 102 may detect the DCI format(s) in a USS (User equipment-specific Search Space) and/or a CSS (Common Search Space). Namely, the UE 102 may detect the DCI format(s) with the RNTI(s).

Here, the RNTI(s) for transmission of the DCI may include C-RNTI (Cell-RNTI), SI-RNTI (System Information RNTI), P-RNTI (Paging RNTI), and/or INT-RNTI (Interruption RNTI). For example, the C-RNTI may be a unique identification used for identifying an RRC connection and/or scheduling. Also, the SI-RNTI may be used for broadcasting of SI (i.e., in the DL). Also, the P-RNTI may be used for transmission (i.e., in the DL) of paging and/or SI change notification. Also, the INT-RNTI may be used for interrupted transmission indication (e.g., for the PDSCH and/or the PUSCH). For example, in a case that the UE 102 detects the DCI format 2_1 with the CRC scrambled by the INT-RNTI, the UE 102 may assume no transmission to the UE 102 is present in PRBs 591 and/or in symbols in the DL and/or the UL that are indicated by using the DCI format 2_1 with the CRC scramble by the INT-RNTI.

Also, the PSCCH may be used for transmitting the SCI used for scheduling of the PSSCH or the PSFCH may be defined. Here, more than one SCI formats may be defined (e.g., configured by the gNB 160 to the UE 102, and/or configured by the transmitter UE-1) to the receiver UE-2) for SCI transmission on the PSCCH. For example, more than one SCI formats may be defined (e.g., used) for a particular SL communication mode (e.g., a mode 1, a mode 2, etc.). Namely, fields may be defined in the SCI format, and the fields are mapped to the information bits (e.g., SCI bits). For example, the SCI format 0, the SCI format 1, the SCI format 2, the SCI format 3, the SCI format 4 and/or the SCI format 5 may be defined as the SCI format(s).

For example, an SCI format 0 and/or an SCI format 1 used for scheduling of the PSSCH may be defined. For example, the SCI formats (e.g., the SCI format 0 and/or 1) may include frequency and/or time domain resource assignment for the PSSCH or the PSFCH. Namely, the SCI formats (e.g., the SCI format 0 and/or 1) may be used for scheduling of the PSFCH (e.g., used for indicating resources of the PSFCH for HARQ-ACK transmission for the PSSCH scheduled by the corresponding SCI format 0 and/or SCI format 1). Also, an SCI format 2 used for indicating a presence of the SCSI-RS in the slot(s) and/or the symbols(s) may be defined. Also, an SCI format 3 that may be used for requesting SL CSI reporting (e.g., aperiodic SL CSI reporting) may be defined. Also, an SCI format 4 that may be used for requesting transmission(s) of SCSI-RS (e.g., in the slot(s) and/or the symbols(s)) may be defined. Also, the SCI format 5 that may be used for notifying the PRB(s) 591 and/or the OFDM symbol(s) where the UE 102 may assume no transmission in the SL is intended for the UE 102 may be defined.

Also, the SCI format(s) (e.g., the SCI format(s) 0, 1, 2, 3, 4, and/or 5) may include information used for indicating a resource pool(s) (e.g., one or more indices of a resource pool(s) (e.g., resource pool-id)). For example, the information used for indicating the resource pool(s) may include one or more indices of transmission (Tx) resource pool(s) (e.g., Tx resource pool-id) and/or one or more indices of reception (Rx) resource pool(s) (e.g., Rx resource pool-id). Namely, in this disclosure, the resource pool(s) may be Tx resource pool(s) and/or Rx resource pool(s).

Also, the SCI format(s) (e.g., the SCI format(s) 0, 1, 2, 3, 4, and/or 5) may include information used for indicating an SL bandwidth part(s) (e.g., one or more indices of an SL BWP(s) (e.g., bwp-id)). The UE 102 may perform the SL communication(s) based on the information used for indicating the resource pool(s) and/or the information used for indicating the BWP(s). Here, as described below, one or more resource pools may be configured in a single SL BWP.

Here, Tx resource pool(s) may be defined (e.g., used) for the SL transmission(s) (e.g., the V2X transmission(s)). Also, Rx resource pool(s) may be defined (e.g., used) for the SL reception(s) (e.g., the V2X reception(s)). For example, the gNB 160 may separately configure, by using the RRC message, Tx resource pool(s) and/or Rx resource pool(s). And, for the SL communication(s), the UE 102 may select one Tx resource pool (e.g., within one or more Tx resource pools) and/or one Rx resource pool (e.g., within one or more Rx resource pools). For example, the UE 102 may select one Tx resource within the selected Tx resource pool, and may perform the SL communication(s) on the selected one Tx resource. Also, the UE 102 may select one Rx resource within the selected Rx resource pool, and may perform the SL communication(s) on the selected one Rx resource. Here, the UE 102 may select one Tx resource pool and/or one Rx resource pool within the same SL BWP (e.g., the configured SL BWP).

Also, for the SL communication(s), the UE 102 may select one SL BWP. The selected one SL BWP may be the configured SL BWP. For example, the UE 102 may select one Tx resource pool and/or one Rx resource pool within the SL BWP. Namely, one or more Tx resource pools and/or one or more Rx resource pools may be configured within the same SL BWP.

For example, in a case that the resource pool(s) is indicated by using the SCI format(s) 0 and/or 1, the UE 102 may perform the SL communication(s) on the indicated resource pools. Also, in a case that the resource pool(s) is indicated by using the SCI format 2, the UE 102 may assume that the SCSI-RS is present in the slot(s) and/or the symbol(s) on the indicated resource pool(s). Also, in a case that the resource pools(s) is indicated by using the SCI format 3, the UE 102 may perform SL CSI reporting on the indicated resource pool(s). Also, in a case that the resource pool(s) is indicated by using the SCI format 4, the UE 102 may consider that the transmission(s) of SCSI-RS is requested on the indicated resource pool(s). And, the UE 102 may perform the SCSI-RS transmission(s) on the indicated resource pool(s). Also, in a case that the resource pool(s) is indicated by using the SCI format 5, the UE 102 may assume no transmission on the indicated resource pool(s) is intended for the UE 102.

Also, in a case that the SL BWP(s) is indicated by using the SCI format(s) 0 and/or 1, the UE 102 may perform the SL communication(s) on the indicated SL BWP(s). Also, in a case that the SL BWP(s) is indicated by using the SCI format 2, the UE 102 may assume that the SCSI-RS is present in the slot(s) and/or the symbol(s) on the indicated SL BWP(s). Also, in a case that the resource pools(s) is indicated by using the SCI format 3, the UE 102 may perform SL CSI reporting on the indicated SL BWP(s). Also, in a case that the resource pool(s) is indicated by using the SCI format 4, the UE 102 may consider that the transmission(s) of SCSI-RS is requested on the indicated SL BWP(s). And, the UE 102 may perform the SCSI-RS transmission on the indicated SL BWP(s). Also, in a case that the resource pool(s) is indicated by using the SCI format 5, the UE 102 may assume no transmission on the indicated SL BWP(s) is intended for the UE 102.

Alternatively or additionally, the transmitter UE-1 may select one resource pool for the SL communication(s), and may indicate by using the information used for indicating the resource pool(s). Also, the transmitter UE-1 may select one SL BWP for the SL communication(s), and may indicate by using the information used for indicating the SL BWP(s). Here, the gNB 106 may transmit to the UE 102 (e.g., the transmitter UE-1 and/or the receiver UE-2), by using the RRC message and/or the DCI format(s), information used for indicating the one resource for the SL communication(s) (e.g., the selected one resource pool).

For example, the transmitter UE-1 may select the resource pool (e.g., a first resource pool) for the PSCCH transmission and/or the PSSCH transmission, and may indicate the resource pool (e.g., the first resource pool) by using the SCI format 0 and/or 1. And, based on the detection of the SCI format 0, the receiver UE-2 may perform the PSCCH reception and/or the PSSCH reception on the indicated resource pool (e.g., the first resource pool). Also, the transmitter UE-1 may select the resource pool (e.g., a second resource pool) for the PSFCH reception, and may indicate the resource pool (e.g., the second resource pool) by using the SCI format 0 and/or 1. And, based on the detection of the SCI format 0, the receiver UE-2 may perform the PSFCH transmission on the indicated resource pool. Alternatively or additionally, the receiver UE-2 may perform the PSFCH transmission on the same resource pool as the resource pool where the PSCCH reception and/or the PSSCH reception is performed. Namely, the same resource pool as the resource pool indicated by the transmitter UE-1 for the PSCCH transmission and/or the PSSCH transmission is performed may be used for the PSFCH feedback (e.g., HARQ-ACK feedback) for the corresponding PSSCH transmission.

Also, the transmitter UE-1 may select the resource pool (e.g., a third resource pool) for the SCSI-RS transmission, and may indicate the resource pool (e.g., the third resource pool) by using the SCI format 2. And, based on the detection of the SCI format 2, the receiver UE-2 may assume that the SCSI-RS is present in the slot(s) and/or the symbol(s) on the indicated resource pool (e.g., the third resource pool).

Also, the transmitter UE-1 may select the resource pool (e.g., a fourth resource pool) for requesting the SL CSI reporting, and may indicate the resource pool (e.g., the fourth resource pool) by using the SCI format 3. And, based on the detection of the SCI format 3, the receiver UE-2 may perform the SL CSI reporting on the indicated resource pool (e.g., the fourth resource pool).

Also, the transmitter UE-1 may select the resource pool (e.g., a fifth resource pool) for requesting the SCSI-RS transmission(s), and may indicate the resource pool (e.g., the fifth resource pool) by using the SCI format 4. And, based on the detection of the SCI format 4, the receiver UE-2 may recognize the SCSI-RS transmission is requested on the indicated resource pool (e.g., the fifth resource pool). And, the receiver UE-2 may perform the SCSI-RS transmission on the indicated resource pool (e.g., the first resource pool).

Also, the transmitter UE-1 may select the resource pool (e.g., a sixth resource pool) for notifying the PRB(s) and/or the OFDM symbol(s) where the receiver UE-2 may assume no transmission in the SL is intended for the UE 102, and may indicate the resource pool (e.g., the sixth resource pool) by using the SCI format 5. And, based on the detection of the SCI format 5, the receiver UE-2 may assume no transmission on the indicated resource pool is intended for the UE 102.

The gNB 160 may transmit, by using the RRC message, information used for configuring one or more RNTIs (Radio Network Temporary Identifier(s)) for transmission of the SCI (e.g., the SCI format(s), the PSCCH(s)). Namely, CRC (Cyclic Redundancy Check) parity bits (also referred to simply as CRC), which are generated based on the SCI, may be attached to the SCI, and, after attachment, the CRC parity bits are scrambled by the RNTI(s). The UE 102 may attempt to decode (e.g., monitor, detect) the SCI to which the CRC parity bits scrambled by the RNTI(s) are attached. Namely, the UE 102 may detect the PSCCH(s) (e.g., the SCI format(s)) based on the blind decoding.

That is, the UE 102 may decode the PSCCH(s) with the CRC scrambled by the RNTI(s). In other words, the UE 102 may monitor the PSCCH(s) with the RNTI(s). Namely, the UE 102 may detect the SCI format(s) with the RNTI(s).

For example, the UE 102 may monitor a set of PSSCH candidates in one or more control resource sets (CORESETs) (e.g., on one or more configured SL BWPs, on one or more activated BWPs, on one or more configured resource pools, on one or more activated resource pools, and/or on one or more selected resource pools) according to corresponding search space set(s) (also referred as search space(s)). Here, the PSSCH monitoring may be configured for the configured SL BWP, and/or the activated BWP. Alternatively or additionally, the PSSCH monitoring may be configured per resource pool (e.g., within the configured SL BWP, and/or the activated BWP). Here the "monitoring" implies decoding each PSCCH candidate according to the monitored SCI formats.

The set of PSCCH candidates for the UE 102 to monitor may be defined in terms of PSCCH search space set(s). A search space set may be a CSS (Common Search Space set) and/or a USS (UE-Specific Search space set). A UE 102 may monitor the PSCCH candidates in one or more of the CSSs and/or the USSs. Namely, the UE 102 may detect the SCI format(s) in the CSS(s) and/or the US S(s).

For example, for the SL communication(s), the gNB 160 may transmit to the UE 102, by using the RRC message, information used for configuring the CSS. Also, for the SL communication(s), the gNB 160 may transmit to the UE 102, by using the RRC message, information used for configuring the USS. Also, for the SL communication(s), the transmitter UE-1 may transmit to the receiver UE-2 by using the RRC message, information used for configuring the CSS. Also, for the SL communication(s), the transmitter UE-1 may transmit to the receiver UE-2 by using the RRC message, information used for configuring the USS. For example, based on the configuration of the CS S(s) and the US S(s) by the gNB 160, the transmitter UE-1 may transmit, to the receiver UE-2, one or more information used for configuring the CSS and/or the USS (e.g., the same configuration(s) of the CSS and/or the USS as the configuration(s) configured by the gNB 160).

Here, the RNTI(s) for transmission of the SCI may include SL-RNTI, SL-V-RNTI (SL-V2X-RNTI), SCSI-RS-RNTI, SCSI-R-RNTI (SL CSI Reporting-CNTI), R-SCSI-RS-RNTI (Request SCI-RS-RNTI), and/or SL-INT-RNTI (SL Interruption RNTI). For example, the SL-RNTI may be used for SL communication(s) scheduling. Also, the SL-V-RNTI may be used for dynamically scheduled SL transmission for V2X SL communication(s). Also, the SL-RNTI may be used for indicating a presence of the SCSI-RS in the slot(s) and/or the symbols(s). Also, the R-SC SI-RS-RNTI may be used for requesting transmission(s) of SCSI-RS (e.g., in the slot(s) and/or the symbols(s)). Also, the INT-RNTI may be used for interrupted transmission indication (e.g., for the PSSCH and/or the PSFCH). For example, the CRC parity bits that attached to the SCI format 0, 1, 2, 3, 4, and/or 5 may be scrambled by the SL-RNTI, the SL-V-RNTI, the SCSI-RS-RNTI, the SCSI-R-RNTI, the R-SCSI-RS-RNTI, and/or the SL-INT-RNTI.

For example, in a case that the UE 102 detects the DCI format 2 with the CRC scrambled by the SCSI-RS-RNTI, the UE 102 may recognize the presence of the SCSI-RS in the slot(s) and/or the symbols(s) (e.g., for acquisition of SL CSI). Also, in a case that the UE 102 detects the DCI format 3 with the CRC scrambled by the SCSI-R-RNTI, the UE 102 may perform the SL CSI reporting (e.g., the aperiodic SL CSI reporting) on the PSSCH and/or the PSFCH. Also, in a case that the UE 102 detects the DCI format 4 with the CRC scrambled by the R-SCSI-RS-RNTI, the UE 102 may perform the SCSI-RS transmission (e.g., for acquisition of SL CSI). Also, in a case that the UE 102 detects the DCI format 5 with the CRC scrambled by the SL-INT-RNTI, the UE 102 may assume no transmission to the UE 102 is present in PRBs and/or in symbols in the SL that are indicated by using the DCI format 5 with the CRC scramble by the SL-INT-RNTI. Here, the RNTI(s) may be used for identifying the SCI format(s).

Here, the gNB 160 may transmit to the UE 102, by using the RRC message, information used for configuring (i.e., indicating) one or more CORESETs where the UE 102 monitors the PSCCH (i.e., the PSCCH candidates). Also, the transmitter UE-1 may transmit to the receiver UE-2, by using the RRC message, information used for configuring one or more CORESETs where the receiver UE-2 monitors the PSCCH (i.e., the PSCCH candidates). For example, based on the configuration of the CORESET(s) by the gNB 160, the transmitter UE-1 may transmit, to the receiver UE-2, information used for configuring the CORESET(s) (e.g., the same configuration(s) of the CORESET(s) as the configuration(s) configured by the gNB 160).

For example, as the configuration(s) of the CORESET(s), an index of the CORESET, a number of consecutive symbol(s), and/or a set of resource block(s) may be configured for each CORESET.

Here, the information used for configuring the CORESET(s) may be configured per resource pool (e.g., Tx resource pool and/or Rx resource pool). Namely, the information used for configuring the CORESET(s) may be configured for each of resource pools (e.g., within the SL bandwidth part (BWP)). For example, the information used for configuring the CORESET(s) may be configured associated with an index of the resource pool. Namely, the information used for configuring the CORESET(s) may be associated with the index of the resource pool (e.g., Tx resource pool and/or Rx resource pool).

Alternatively or additionally, the information used for configuring the CORESET(s) may be configured per SL BWP. Namely, the information used for configuring the CORESET(s) may be configured for each of SL BWPs. For example, the information used for configuring the CORESET(s) may be configured associated with an index of the SL BWP (e.g., bwp-Id). Namely, the information used for configuring the CORESET(s) may be associated with the index of the SL BWP. Here, as described below, the index of the SL BWP may be linked to (e.g., paired with) an index of the DL BWP and/or an index of the UL BWP.

Alternatively or additionally, the information used for configuring the CORESET(s) may be configured per serving cell (or carrier). Namely, the information used for configuring the CORESET(s) may be configured for each of serving cells (or carriers). For example, the information used for configuring the CORESET(s) may be configured associated with an index of the serving cell (or an index of the carrier). Namely, the information used for configuring the CORESET(s) may be associated with the index of the serving cell (or the index of the carrier). Here, the carrier may be corresponding to a frequency band (e.g., a frequency range).

Alternatively or additionally, the information used for configuring the CORESET(s) may be configured per SCI format. Namely, the information used for configuring the CORESET(s) may be configured for each of the SCI formats.

Alternatively or additionally, the information used for configuring the CORESET(s) may be configured per search space set. Namely, the information used for configuring the CORESET(s) may be configured for each of the search space sets.

Alternatively or additionally, the configuration(s) of the CORESET(s) may be configured per resource pool (e.g., Tx resource pool and/or Rx resource pool). Namely, the configuration(s) of the CORESET(s) may be configured for each of resource pools (e.g., within the SL BWP). For example, the configuration(s) of the CORESET(s) may be configured associated with an index of the resource pool. Namely, the configuration(s) of the CORESET(s) may be associated with the index of the resource pool (e.g., Tx resource pool and/or Rx resource pool).

Alternatively or additionally, the configuration(s) of the CORESET(s) may be configured per SL BWP. Namely, the configuration(s) of the CORESET(s) may be configured for each of SL BWPs. For example, the configuration(s) of the CORESET(s) may be configured associated with an index of the SL BWP. Namely, the configuration(s) of the CORESET(s) may be associated with the index of the SL BWP. Here, as described below, the index of the SL BWP may be linked to (e.g., paired with) an index of the DL BWP and/or an index of the UL BWP.

Alternatively or additionally, the configuration(s) of the CORESET(s) may be configured per serving cell (or carrier). Namely, the configuration(s) of the CORESET(s) may be configured for each of serving cells (or carriers). For example, the configuration(s) of the CORESET(s) may be configured associated with an index of the serving cell (or an index of the carrier). Namely, the configuration(s) of the CORESET(s) may be associated with the index of the serving cell (or the index of the carrier).

Alternatively or additionally, the configuration(s) of the CORESET(s) may be configured per SCI format. Namely, the configuration(s) of the CORESET(s) may be configured for each of the SCI formats. Alternatively or additionally, the configuration(s) of the CORESET(s) may be configured per search space set. Namely, the configuration(s) of the CORESET(s) may be configured for each of the search space sets.

Also, the gNB 160 may transmit to the UE 102, by using the RRC message, information used for configuring (i.e., indicating) one or more search space sets where the UE 102 monitors the PSCCH (i.e., the PSCCH candidates). Also, the transmitter UE-1 may transmit to the receiver UE-2, by using the RRC message, information used for configuring one or more search space sets where the receiver UE-2 monitors the PSCCH (i.e., the PSCCH candidates). For example, based on the configuration of the search space set(s) by the gNB 160, the transmitter UE-1 may transmit, to the receiver UE-2, information used for configuring the search space set(s) (e.g., the same configuration(s) of the search space set(s) as the configuration(s) configured by the gNB 160).

For example, as the configuration(s) of the search space set(s), an index of the search space set, an association between the search space set and the CORESET, a PSCCH monitoring periodicity (e.g., a periodicity of the slot(s) and/or an offset of the slot(s)), a PSCCH monitoring pattern within the slot(s) (e.g., symbol(s) within the slot(s) for PSCCH monitoring), and/or an indication that search space set is either the CSS or the USS may be configured for each of search space sets (i.e., per search space set). Here, the UE 102 may determine a PSCCH monitoring occasion(s) based on the PSCCH monitoring periodicity and/or the PSCCH monitoring patter within the slot(s).

Alternatively or additionally, as the configuration(s) of the search space set(s), the SCI format(s) and/or the RNTI(s) (i.e., the RNTI(s) for transmission of the SCI) where the UE 102 monitors the PSCCH (i.e., the PSCCH candidates) may be configured for each of search space sets (i.e., per search space set). Namely, a parameter(s) to monitor the PSCCH (i.e., the PSCCH candidates) for the SCI format(s) with CRC scrambled by the RNTI(s) may be configured for each of the search space sets (per search space set). Here, the SCI format(s) may be one or more (e.g., any combination) of the SCI format(s) 0, 1, 2, 3, 4, and/or 5, as described above. Also, the RNTI(s) may be one or more (e.g., any combination) of the SL-RNTI, the SL-V-RNTI, the SCSI-RS-RNTI, the SCSI-R-RNTI, the R-SCSI-RS-RNTI, and/or the SL-INT-RNTI.

For example, for each of search space sets (i.e., per search space set), the UE 102 may be configured to monitor the PSCCH for the SCI formats 0 and 1 with CRC scrambled by the SL-RNTI and the SL-V-radio network temporary identifier (RNTI). Also, for each of search space sets (i.e., per search space set), the UE 102 may be configured to monitor the PSCCH for the SCI formats 3 with CRC scrambled by the SCSI-RS-RNTI. Also, for each of search space sets (i.e., per search space set), the UE 102 may be configured to monitor the PSCCH for the SCI formats 4 with CRC scrambled by the SCSI-R-RNTI. Also, for each of search space sets (i.e., per search space set), the UE 102 may be configured to monitor the PSCCH for the SCI formats 5 with CRC scrambled by the SL-INT-RNTI.

Here, the information used for configuring the search space set(s) may be configured per resource pool (e.g., Tx resource pool and/or Rx resource pool). Namely, the information used for configuring the search space set(s) may be configured for each of resource pools (e.g., within the SL BWP). For example, the information used for configuring the search space set(s) may be configured associated with an index of the resource pool. Namely, the information used for configuring the search space set(s) may be associated with the index of the resource pool (Tx resource pool and/or Rx resource pool).

Alternatively or additionally, the information used for configuring the search space set(s) may be configured per SL BWP. Namely, the information used for configuring the search space set(s) may be configured for each of SL BWPs. For example, the information used for configuring the search space set(s) may be configured associated with an index of the SL BWP. Namely, the information used for configuring the search space set(s) may be associated with the index of the SL BWP. Here, as described below, the index of the SL BWP may be linked to (e.g., paired with) an index of the DL BWP and/or an index of the UL BWP.

Alternatively or additionally, the information used for configuring the search space set(s) may be configured per serving cell (or carrier). Namely, the information used for configuring the search space set(s) may be configured for each of serving cells (or carriers). For example, the information used for configuring the search space set(s) may be configured associated with an index of the serving cell (or an index of the carrier). Namely, the information used for configuring the search space set(s) may be associated with the index of the serving cell (or the index of the carrier).

Alternatively or additionally, the information used for configuring the search space set(s) may be configured per SCI format. Namely, the information used for configuring the search space set(s) may be configured for each of the SCI formats.

Alternatively or additionally, the configuration(s) of the search space set(s) may be configured per resource pool (e.g., Tx resource pool and/or Rx resource pool). Namely, the configuration(s) of the search space set(s) may be configured for each of resource pools (e.g., within the SL BWP). For example, the configuration(s) of the search space set(s) may be configured associated with an index of the resource pool. Namely, the configuration(s) of the search space set(s) may be associated with the index of the resource pool (e.g., Tx resource pool and/or Rx resource pool).

Alternatively or additionally, the configuration(s) of the search space set(s) may be configured per SL BWP. Namely, the configuration(s) of the search space set(s) may be configured for each of SL BWPs. For example, the configuration(s) of the search space set(s) may be configured associated with an index of the SL BWP. Namely, the configuration(s) of the search space set(s) may be associated with the index of the SL BWP. Here, as described below, the index of the SL BWP may be linked to (e.g., paired with) an index of the DL BWP and/or an index of the UL BWP.

Alternatively or additionally, the configuration(s) of the search space set(s) may be configured per serving cell (or carrier). Namely, the configuration(s) of the search space set(s) may be configured for each of serving cells (or carriers).

Alternatively or additionally, the configuration(s) of the search space set(s) may be configured per SCI format. Namely, the configuration(s) of the search space set(s) may be configured for each of the SCI formats. For example, the configuration(s) of the search space set(s) may be configured associated with an index of the serving cell (or an index of the carrier). Namely, the configuration(s) of the search space set(s) may be associated with the index of the serving cell (or the index of the carrier).

The UE 102 may monitor the PSCCH (i.e., the PSCCH candidates) based on the information and/or the configuration by the gNB 160. Also, the receiver UE-2 may monitor the PSCCH (i.e., the PSCCH candidates) based on the information and/or the configuration by the transmitter UE-1.

Here, the UE 102 may detect the PSCCH(s) (i.e., the SCI format(s)) based on the decoding of the PSCCH(s) (i.e., the SCI format(s)). Namely, the SCI format(s) (e.g., the SCI format 6) that is used for scheduling of the PSCCH(s) may be defined. Here, the SCI format(s) (e.g., the SCI format 6) may be referred as a first-stage SCI format(s) and/or a first-step SCI format(s). Also, the SCI format(s) (e.g., the SCI formats 0, 1, 2, 3, 4, and/or 5) may be referred as a second-stage SCI format(s) and/or a second-step SCI format(s). Namely, based on the decoding of the PSCCH (i.e., the first-stage SCI format(s)), the UE 102 may identify a resource(s) of the PSSCH(s) (e.g., a position(s) of the PSCCH(s)) for the PSSCH (i.e., for the second-stage SCI format(s)). Also, based on the decoding of the PSCCH (i.e., the first-stage SCI format(s)), the UE 102 may identify a format(s) for the PSSCH (i.e., for the second-stage SCI format(s)).

Here, the gNB 160 may transmit to the UE 102, by using the RRC message, information used for configuring a resource(s) of the PSSCH(s) (e.g., a position(s) of the PSCCH(s)) for the PSSCH(s) (i.e., for the first-stage SCI format(s)). Also, the gNB 160 may transmit to the UE 102, by using the RRC message, information used for configuring a format(s) for the PSSCH(s) (i.e., for the first-stage SCI format(s)). Also, the transmitter UE-1 may transmit to the receiver UE-2, by using the RRC message, information used for configuring a resource(s) of the PSSCH(s) for the PSSCH(s) (i.e., for the first-stage SCI format(s)). Also, the transmitter UE-1 may transmit to the receiver UE-2, by using the RRC message, information used for configuring a format(s) for the PSSCH(s) (i.e., for the first-stage SCI format(s)). For example, based on the configuration(s) of the PSSCH(s) (i.e., for the first-stage SCI format(s)) by the gNB 160, the transmitter UE-1 may transmit, to the receiver UE-2, information used for configuring the PSSCH(s) (i.e., for the first-stage SCI format(s)) (e.g., the same configuration(s) of the PSSCH(s) as the configuration(s) configured by the gNB 160).

Here, the information used the resource(s) of the PSSCH(s) (i.e., for the first-stage SCI format(s)) and/or the information used for configuring a format(s) for the PSSCH (i.e., for the first-stage SCI format(s)) may be referred as first information.

Here, the first information may be configured per resource pool (e.g., Tx resource pool and/or Rx resource pool). Namely, the first information may be configured for each of resource pools (e.g., within the SL BWP). For example, the first information may be configured associated with an index of the resource pool. Namely, the information used for configuring the search space set(s) may be associated with the index of the resource pool (e.g., Tx resource pool and/or Rx resource pool).

Alternatively or additionally, the first information may be configured per SL BWP. Namely, the first information may be configured for each of SL BWPs. For example, the first information may be configured associated with an index of the SL BWP. Namely, the first information may be associated with the index of the SL BWP. Here, as described below, the index of the SL BWP may be linked to (e.g., paired with) an index of the DL BWP and/or an index of the UL BWP.

Alternatively or additionally, the first information may be configured per serving cell (or carrier). Namely, the first information may be configured for each of serving cells (or carriers). For example, the first information may be configured associated with an index of the serving cell (or an index of the carrier). Namely, the first information may be associated with the index of the serving cell (or the index of the carrier).

Alternatively or additionally, the first information may be (pre-)configured for one resource pool. Namely, the UE 102 may decode the PSSCH(s) (i.e., the first-stage SCI format(s)) on only one resource pool. The gNB 160 may transmit to the UE 102, by using the RRC message, information used for configuring one resource pool where the UE 102 decodes the PSCCH (i.e., the first-stage SCI format(s)). Also, the transmitter UE-1 may transmit to the receiver UE-2, by using the RRC message, information used for configuring one resource pool where the receiver UE-2 decodes the PSCCH (i.e., the first-stage SCI format(s)).

Alternatively or additionally, the first information may be (pre-)configured for one SL BWP (e.g., the configured SL BWP, the activated SL BWP). Namely, the UE 102 may decode the PSSCH(s) (i.e., the first-stage SCI format(s)) on only one SL BWP. As described below, the gNB 160 may transmit to the UE 102, by using the RRC message, information used for configuring one SL BWP where the UE 102 decodes the PSCCH (i.e., the first-stage SCI format(s)). Also, the transmitter UE-1 may transmit to the receiver UE-2, by using the RRC message, information used for configuring one SL BWP where the receiver UE-2 decodes the PSCCH (i.e., the first-stage SCI format(s)).

Alternatively or additionally, the first information may be (pre-)configured for one serving cell (or one carrier). Namely, the UE 102 may decode the PSSCH(s) (i.e., the first-stage SCI format(s)) on only one serving cell (or only one carrier). The gNB 160 may transmit to the UE 102, by using the RRC message, information used for configuring one serving cell (or one carrier) where the UE 102 decodes the PSCCH (i.e., the first-stage SCI format(s)). Also, the transmitter UE-1 may transmit to the receiver UE-2, by using the RRC message, information used for configuring one serving cell (or carrier) where the receiver UE-2 decodes the PSCCH (i.e., the first-stage SCI format(s)). The serving cell where the UE 102 decode the PSSCH (i.e., the first-stage SCI format) may be a primary cell.

Namely, based on the reception of the first information, the UE 102 may decode (e.g., receive) the PSSCH(s) (i.e., the first-stage SCI format(s)). Namely, the UE 102 may monitor (i.e., blind decode) or may not monitor (i.e., blind decode) the PSSCH (i.e., for the first stage SCI format(s)). The UE 102 may monitor only the PSCCH(s) (i.e., for the second-stage SCI format(s)) based on the information and/or the configuration(s).

For example, the SCI format 6 may include frequency domain assignment for the PSCCH (i.e., for the second-stage SCI format(s)). Also, the SCI format 6 may include time domain assignment for the PSCCH (i.e., for the second-stage SCI format(s)). Also, the SCI format may include an indication used for indicating the SCI format(s) (i.e., the second-stage SCI format(s)). Also, the SCI format 6 may include the information used for configuring the CORESET(s). Also, the SCI format 6 may include the configuration(s) of the CORESET(s). Also, the SCI format 6 may include the information used for configuring the search space set(s). Also, the SCI format 6 may include the configuration(s) of the search space set(s). Here, the information and/or the configuration(s) included in the SCI format 6 may be referred as an indication for the second-stage SCI format(s).

Also, the SCI format 6 may include the information used for indicating the resource pool(s) (e.g., the one or more indices of the resource pool(s) (e.g., resource pool-id (i.e., Tx resource pool-id and/or Rx resource pool-id)). Also, the SCI format 6 may include the information used for indicating the SL BWP(s) (e.g., the one or more indices of the SL BWP(s) (e.g., BWP-id)). Namely, the UE 102 may monitor the PSCCH(s) (e.g., the second-stage SCI format(s)) based on the information used for indicating the resource pool(s) and/or the information used for indicating the SL BWP(s).

For example, in a case that the resource pool(s) is indicated by using the SCI format 6, the UE 102 may monitor the PSCCH(s) (e.g., the second-stage SCI format(s)) on the indicated resource pool(s). The UE 102 may monitor, based on the indication for the second-stage SCI format(s), the PSCCH (e.g., the second-stage SCI format(s)) on the indicated resource pool(s). Also, in a case that the SL BWP(s) is indicated by using the SCI format 6, the UE 102 may monitor the PSCCH(s) (e.g., the second-stage SCI format(s)) on the indicated SL BWP(s). The UE 102 may monitor, based on the indication for the second-stage SCI format(s), the PSCCH (e.g., the second-stage SCI format(s)) on the indicated SL BWP(s).

Alternatively or additionally, the transmitter UE-1 may select the resource pool (e.g., a seventh resource pool) for monitoring the PSSCH(s) (e.g., the second-stage SCI format(s)), and may indicate the resource pool (e.g., the seventh resource pool) by using the SCI format 6. And, based on the detection of the SCI format 6, the receiver UE-2 may monitor the PSSCH (e.g., the second-stage SCI format(s)). Here, the gNB 106 may transmit to the UE 102 (e.g., the transmitter UE-1 and/or the receiver UE-2), by using the RRC message and/or the DCI format(s), information used for indicating the one resource for the SL communication(s).

Namely, the indication for the second-stage SCI format(s) may be indicated per resource pool and/or per SL BWP. The indication for the second-stage SCI format(s) may be indicated for each of resource pools (e.g., within the single SL BWP) and/or each of the SL BWPs. Namely, the indication for the second-stage SCI format(s) may be associated with the index of the resource pool(s). Also, the indication for the second-stage SCI format(s) may be associated with the index of the SL BWP(s).

Here, the SCI format 6 may include the index of the serving cell (or the index of the carrier). Namely, the indication for the second-stage SCI format(s) may be indicated per serving cell (or carrier). The indication for the second-stage SCI format(s) may be indicated for each of serving cells (or carriers). Namely, the indication for the second-stage SCI format(s) may be indicated associated with the index of the serving cell (or the index of the carrier). The indication for the second-stage SCI format(s) may be associated with the index of the serving cell (or the index of the carrier).

As described above, the information (i.e., the information associated with the PSCCH) and/or the configuration (i.e., the configuration(s) associated with the PSCCH) may be configured by using the RRC message. Also, the information (i.e., the information associated with the PSCCH) and/or the configuration(s) (i.e., the configuration(s) associated with the PSCCH) may be indicated by using the SCI format 6. Here, a part of the information and/or a part of the configuration(s) may be configured by using the RRC message, and a part of the information and/or a part of the configuration(s) may be indicated by using the SCI format 6. Namely, the combination of use of the RRC message and use of the SCI format 6 is not excluded.

Figure 6:
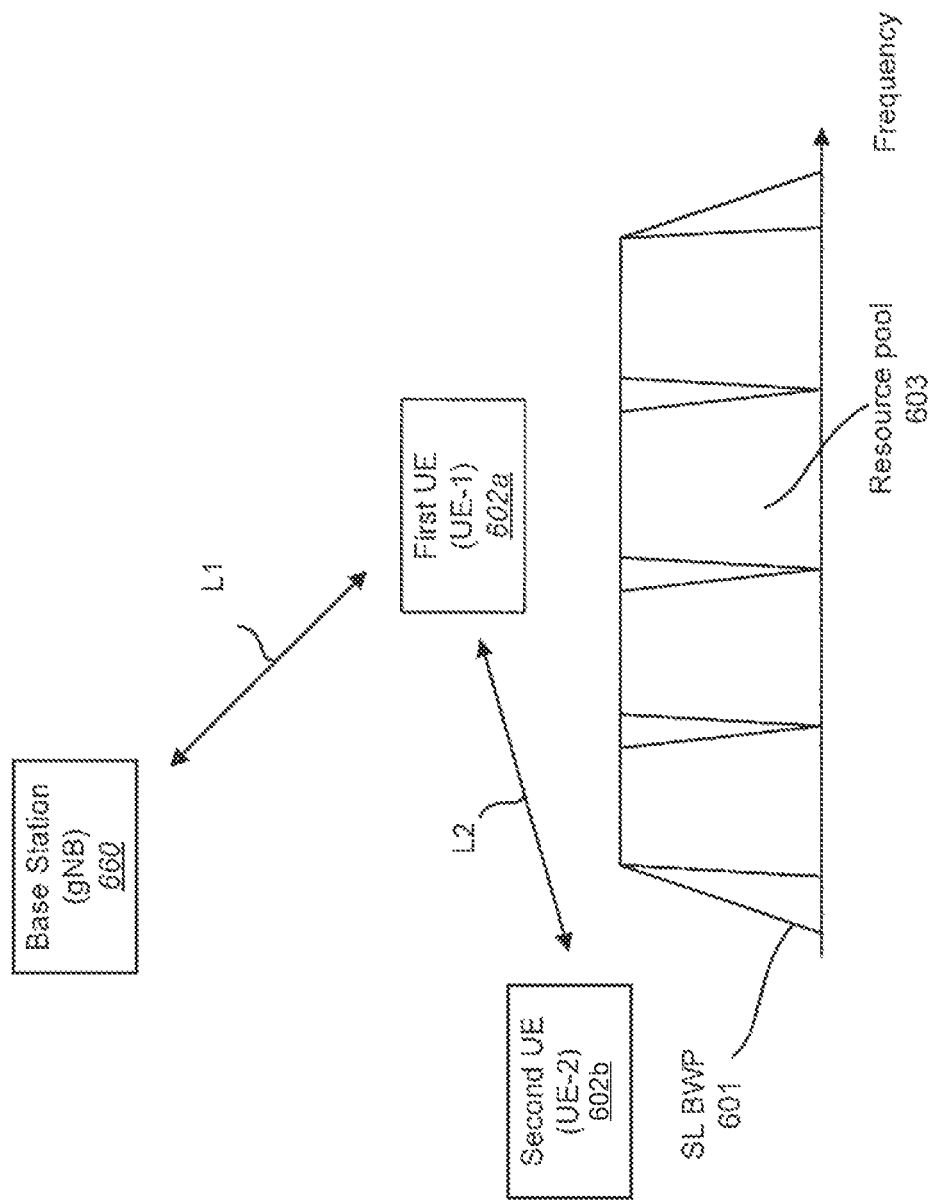
FIG. 6 shows examples of a bandwidth part(s) (BWP(s)) and/or a resource pool(s).

FIG. 6 shows examples of a bandwidth part(s) (BWP(s)) and/or a resource pool(s) 603. In FIG. 6, as one example, a single sidelink (SL) BWP 601 is configured, four resource pools 603 are configured within the single SL BWP 601. A first UE 602a (referred to as a UE 602 or a transmitter UE-1) transmits data to a second UE 602b (referred to as a UE 602 or a receiver UE-2).

Here, for serving cell(s), the gNB 660 may transmit to the UE 602, by using the RRC message, information used for configuring DL bandwidth part(s) (i.e., DL BWP(s)). For example, the gNB 660 may configure a set of DL BWPs (e.g., at most four DL BWPs, a DL BWP set) in a serving cell (e.g., for receptions by the UE 602). Also, as a configuration(s) for the DL BWP, for each DL BWP, the gNB 660 may configure, by using the RRC message, the subcarrier spacing, the cyclic prefix, a number of contiguous PRBs (e.g., a bandwidth of PRBs), and/or the index of DL BWP (e.g., bwp-Id). Here, a single DL BWP may be activated at a given time. Namely, an activation and/or a deactivation may be supported for the DL BWP(s). For example, the UE 602 may perform, based on the configuration(s), the PDCCH reception, the PDSCH reception, and/or the CSI-RS reception on the activated DL BWP.

Also, for serving cell(s), the gNB 660 may transmit to the UE 602, by using the RRC message, information used for configuring UL bandwidth part(s) (i.e., UL BWP(s)). For example, the gNB 660 may configure a set of UL BWPs (e.g., at most four UL BWPs, a UL BWP set) in a serving cell (e.g., for transmissions by the UE 602). Also, as a configuration(s) for the UL BWP, for each UL BWP, the gNB 660 may configure, by using the RRC message, the subcarrier spacing, the cyclic prefix, a number of contiguous PRBs (e.g., a bandwidth of PRBs), and/or the index of UL BWP (e.g., bwp-Id). Here, a single UL BWP set may be activated at a given time. Namely, an activation and/or a deactivation may be supported for the UL BWP(s). For example, the UE 602 may perform, based on the configuration(s), the PUSCH transmission, and/or the PUCCH transmission on the activated UL BWP.

Here, in a carrier aggregation (CA), the gNB 660 and the UE 602 may communicate each other using one or more serving cells. The one or more serving cell may include one primary cell and one or more secondary cells. For example, the gNB 660 may transmit to the UE 602, by using the RRC message, information used for configuring the primary cell. Also, the gNB 660 may transmit to the UE 602, by using the RRC message, information used for configuring one or more secondary cells to form together with the primary cell a set of serving cells.

Also, the gNB 660 may transmit to the UE 602, by using the RRC message, information used for configuring SL bandwidth part(s) 601 (i.e., SL BWP 601). For example, the gNB 660 may configure to the UE 602 only one SL BWP 601 in the SL. Alternatively or additionally, the gNB 660 may configure to the UE 602 a set of UL BWPs (e.g., at most two UL BWPs, an SL BWP set) in the SL (e.g., for the SL communications(s) by the transmitter UE-1 and the receiver UE-2). Also, as a configuration(s) for the SL BWP 601, for each SL BWP 601, the gNB 660 may configure, by using the RRC message, the subcarrier spacing, the cyclic prefix, a number of contiguous PRBs (e.g., a bandwidth of PRBs), and/or the index of SL BWP 601 (e.g., bwp-Id).

Also, the transmitter UE-1 may transmit to the receiver UE-2, by using the RRC message, information used for configuring SL BWP 601. For example, the transmitter UE-1 may configure to the receiver UE-2 only one SL BWP 601 in the SL. Alternatively or additionally, the transmitter UE-1 may configure to the receiver UE-2 a set of UL BWPs (e.g., at most two UL BWPs, an SL BWP set) in the SL (e.g., for the SL communications(s) by the transmitter UE-1 and the receiver UE-2). Also, as the configuration(s) of the SL BWP 601, for each SL BWP 601, the transmitter UE-1 may configure to the receiver UE-2, by using the RRC message, the subcarrier spacing, the cyclic prefix, a number of contiguous PRBs (e.g., a bandwidth of PRBs), and/or the index of SL BWP 601 (e.g., bwp-Id). For example, based on the configuration of the SL BWP 601 by the gNB 660, the transmitter UE-1 may transmit, to the receiver UE-2, one or more information used for configuring the SL BWP 601 (e.g., the same configuration(s) of the SL BWP 601 as the configuration(s) configured by the gNB 660).

Here, the single SL BWP 601 may be activated at a given time. For example, the configured SL BWP 601 may be always considered as being activated. And, the transmitter UE-1 and the receiver UE-2 may perform, based on the configuration(s), the SL communication(s) on the activated SL BWP 601. Namely, the same SL BWP 601 may be used for the SL communication(s).

For example, based on the configuration(s) of the SL BWP 601 for the transmitter UE-1, the transmitter UE-1 and/or the receiver UE-2 may change the configuration(s) of the SL BWP 601 (e.g., change to the configuration(s) of the SL BWP 601 where the transmitter UE-1 is configured). The transmitter UE-1 may transmit, to the receiver UE-2, an indication used for indicating the configuration(s) of the SL BWP 601 where the transmitter UE-1 is configured.

Also, based on the configuration(s) of the SL BWP 601 for the receiver UE-2, the transmitter UE-1 and/or the receiver UE-2 may change the configuration(s) of the SL BWP 601 (e.g., change to the configuration(s) of the SL BWP 601 where the receiver UE-2 is configured). The receiver UE-2 may transmit, to the transmitter UE-1, an indication used for indicating the configuration(s) of the SL BWP 601 where the receiver UE-2 is configured.

Here, the SL BWP 601 may be defined separately from Uu BWP(s) (e.g., the DL BWP(s) and/or the UL BWP(s)). For example, for the UE 602 in RRC_IDLE (i.e., RRC_IDLE state) and/or the UE 602 in out-of-coverage, one SL BWP 601 may be (pre-) configured. Also, for the UE 602 in RRC_CONNECTED (i.e., RRC_CONNECTED state), one SL BWP 601 may be active in a carrier. Namely, an activation and/or a deactivation may not be supported for the SL BWP 601. For example, no signaling may be exchanged in the SL for the activation and/or the deactivation of the SL BWP 601.

Here, the SL BWP 601 may be linked with the DL BWP(s) and/or the UL BWP(s). For example, in a case that the index of the SL BWP 601 and the index of the DL BWP(s) are the same, the SL BWP 601 and the DL BWP(s) may be considered as being linked. Also, in a case that the index of the SL BWP 601 and the index of the UL BWP(s) are the same, the SL BWP 601 and the UL BWP(s) may be considered as being linked. Here, in a case that the index of the DL BWP(s) and the index of the UL BWP(s) are the same, the DL BWP(s) and the UL BWP(s) may be considered as being linked.

For example, for an unpaired spectrum operation(s) (e.g., operation(s) on an unpaired frequency band(s)), the UE 602 may identify, based on the index of the SL BWP 601, the index of the DL BWP(s), and/or the index of the UL BWP(s), the linkage between the SL BWP 601 (e.g., the index of the SL BWP 601), the DL BWP(s) (e.g., the index of the DL BWP(s)), and/or the UL BWP(s) (e.g., the index of the UL BWP(s)).

Alternatively or additionally, (e.g., for a paired spectrum operation(s) (e.g., operation(s) on a paired frequency band(s))), the index of the DL BWP(s) and/or the index of the UL BWP(s) may be applied for the index of the SL BWP 601. For example, (e.g., for the paired spectrum operation(s)), the UE 602 may apply the same index for the DL BWP(s) and the SL BWP 601. Namely, the index of the DL BWP(s) may be used for the index of the SL BWP 601. Alternatively or additionally, the UE 602 may apply the same index for the DL BWP(s) and the SL BWP 601. Namely, the index of the UL BWP(s) may be used for the index of the SL BWP 601.

For example, (e.g., for the paired spectrum operation(s)), the gNB 660 may configure to the UE 602, the index of the DL BWP(s) and/or the index of the UL BWP(s). And, the configured index of the DL BWP(s) and/or the configured index of the UL BWP(s) may be used for the index of the SL BWP 601. Namely, only the index of the DL BWP(s) and/or only the index of the UL BWP(s) may be configured to the UE 602. And, the index of the SL BWP 601 may not be configured to the UE 602. For example, in a case that the index of the SL BWP 601 is configured to the UE 602, the UE 602 may identify, based on the index of the SL BWP 601, the index of the SL BWP 601. Also, in a case that the index of the SL BWP 601 is not configured to the UE 602, the UE 602 may identify, based on the index of the DL BWP(s) and/or the index of the UL BWP(s), the index of the SL BWP 601.

Also, (e.g., for the paired spectrum operation(s)), in a case that the index of the SL BWP 601 is configured to the UE 602, the UE 602 may identify, based on the index of the SL BWP 601, the linkage between the SL BWP 601 (e.g., the index of the SL BWP 601), the DL BWP(s) (e.g., the index of the DL BWP(s), and/or the UL BWP(s) (e.g., the index of the UL BWP(s)). Also, (e.g., for the paired spectrum operation(s)), in a case that the index of the SL BWP 601 is not configured to the UE 602, the UE 602 may identify, based on the index of the DL BWP(s) and/or the index of the UL BWP(s), the linkage between the SL BWP 601 (e.g., the index of the SL BWP(s) 601), the DL BWP(s) (e.g., the index of the DL BWP(s), and/or the UL BWP(s) (e.g., the index of the UL BWP(s)).

Here, (e.g., for the paired spectrum operation(s)), the index of the DL BWP(s) may be applied for the index of the UL BWP(s). Namely, the same index may be used for the DL BWP(s) and/or the UL BWP(s). Namely, the gNB 660 may configure to the UE 602, the index of the DL BWP(s). And, the UE 602 may identify, based on the index of the DL BWP(s), the index of the UL BWP(s) and/or the index of the SL BWP 601. Also, the UE 602 may identify, based on the index of the DL BWP(s), the linkage between the SL BWP 601 (e.g., the index of the SL BWP(s) 601), the DL BWP(s) (e.g., the index of the DL BWP(s)), and/or the UL BWP(s) (e.g., the index of the UL BWP(s)).

Alternatively or additionally, the transmitter UE-1 may configure to the receiver UE-2, the one SL BWP 601. Here, the transmitter UE-1 may select the one SL BWP 601 within the UL BWP(s) configured by the gNB 660. Namely, the gNB 660 may configure to the transmitter UE-1, one or more UL BWPs (e.g., at most four BWPs, as described above). And, the transmitter UE-1 may select the one SL BWP 601 within the one or more UL BWPs. Namely, the one SL BWP 601 is configured (e.g., selected) from the UL BWP(s). For example, the one SL BWP 601 may be configured as a part of the UL BWP(s). Also, the one SL BWP 601 may be associated with one of the one or more UL BWP(s). Here, the gNB 660 may transmit to the transmitter UE-1, by using the RRC message, information used for configuring (e.g., selecting) the one SL BWP 601 (e.g., from the one or more UL BWPs). And, the transmitter UE-1 and the receiver UE-2 may perform the SL communication(s) on the one SL BWP 601 configured (e.g., selected) within the one or more UL BWPs.

Alternatively or additionally, a resource pool 603 may be defined as a set of time-frequency resources used for the SL communication(s). Here, the time resource may include a set of slots, subframes, and/or OFDM symbols, and/or groups of OFDM symbols. Also, the frequency resource may include a set of PRBs. From the UE point of view, a resource pool 603 may be inside the UE's bandwidth, within the SL BWP 601. Here, for the SL BWP 601, a single numerology (i.e., a subcarrier spacing and/or a cyclic prefix) may be configured. Also, one or more resource pools 603 may be (pre-) configured to the UE 602 in a carrier. Alternatively or additionally, one or more resource pools 603 may be configured to the UE 602 within the single SL BWP 601. Namely, as described above, the one or more indices of the resource pools 603 may be configured for the single SL BWP 601.

For example, the gNB 660 may transmit to the UE 602, by using the RRC message (e.g., system information block(s)), information used for configuring one or more resource pools 603 (e.g., within the SL BWP 601). Namely, one or more indices of the resource pools 603 (e.g., Tx resource pool-id and/or Rx resource pool-id) may be associated with the index of the SL BWP 601 (bwp-id). Also, the gNB 660 may transmit to the UE 602, by using the dedicated RRC message, the information used for configuring one or more resource pools 603 (e.g., within the SL BWP 601).

Also, the gNB 660 may transmit to the UE 602, by using the RRC message (e.g., system information block(s)), information used for configuring one resource(s) (e.g., within the resource pool(s) 603). Also, the gNB 660 may transmit to the UE 602, by using the dedicated RRC message, the information used for configuring one resource(s) (e.g., within the resource pool(s) 603).

Also, the transmitter UE-1 may transmit to the receiver UE-2, by using the RRC message (e.g., system information block(s)), the information used for configuring one or more resource pools 603 (e.g., within the SL BWP 601). Also, the transmitter UE-1 may transmit to the receiver UE-2, by using the dedicated RRC message, the information used for configuring one or more resource pools 603 (e.g., within the SL BWP 601).

Also, the transmitter UE-1 may transmit to the receiver UE-2, by using the RRC message (e.g., system information block(s)), the information used for configuring one resource(s) (e.g., within the resource pool(s) 603). Also, the transmitter UE-1 may transmit to the receiver UE-2, by using the dedicated RRC message, the information used for configuring one resource(s) (e.g., within the resource pool(s) 603).

Figure 7:
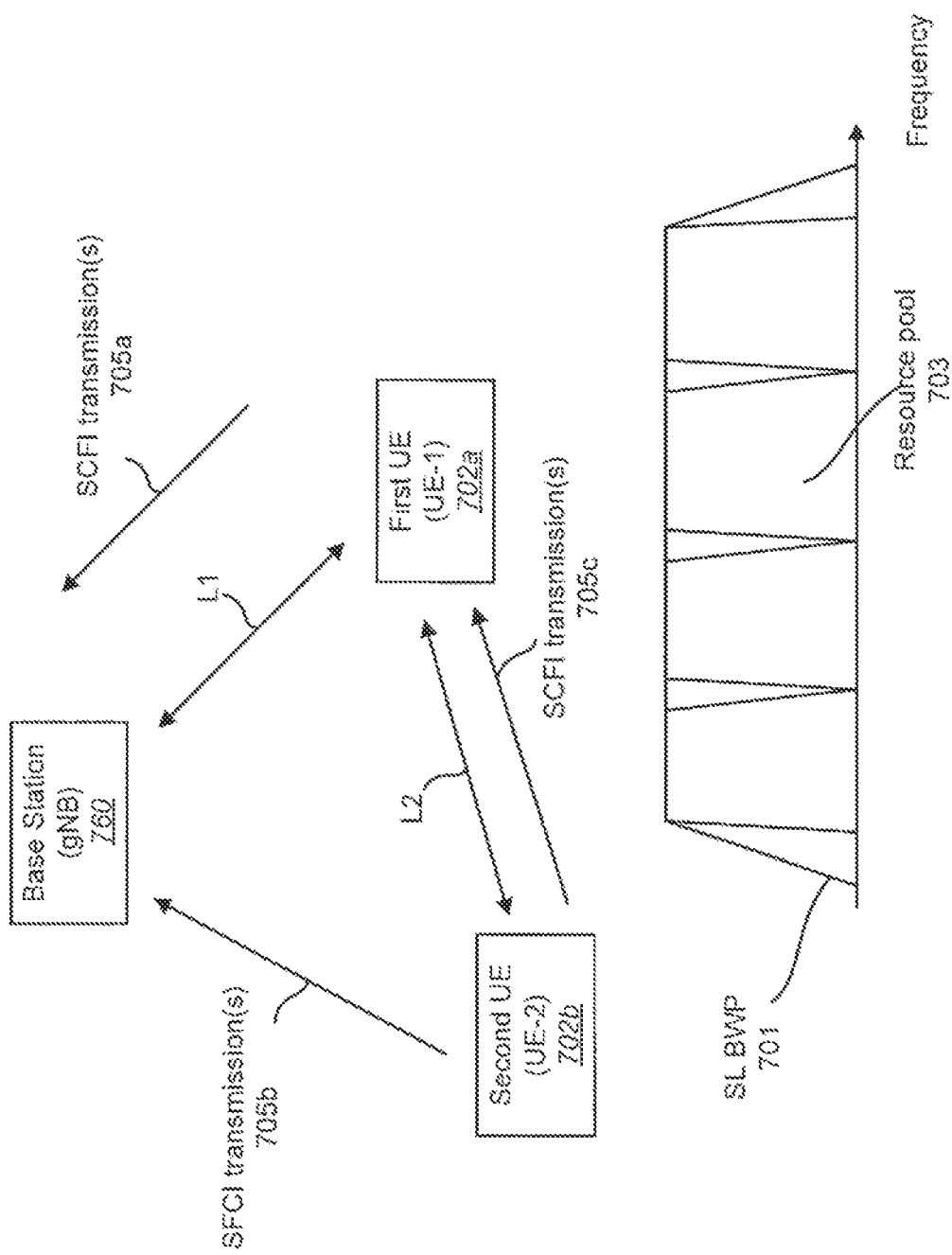
FIG. 7 shows examples of SL feedback control information (SFCI) transmission(s).

FIG. 7 shows examples of SL feedback control information (SFCI) transmission(s) 705a, 705b and 705c. A first UE 702a (referred to as a UE 702 or a transmitter UE-1) transmits data to a second UE 702b (referred to as a UE 702 or a receiver UE-2).

As described above, SFCI 705c (e.g., the SL HARQ feedback and/or the SL CSI reporting) may be transmitted from the receiver UE-2 to the transmitter UE-1. Also, SFCI 705a (e.g., the SL HARQ feedback and/or the SL CSI reporting) may be transmitted from the transmitter UE-1 to the gNB 760. Furthermore, SFCI 705b (e.g., the SL HARQ feedback and/or the SL CSI reporting) may be transmitted from the receiver UE-2 to the gNB 760.

Here, for the SL HARQ feedback and/or the SL CSI reporting, more than one SFCI formats may be defined. For example, an SFCI format 1 may be defined for transmission of the SL HARQ-ACK (e.g., the SL HARQ feedback from the receiver UE-2 to the transmitter UE-1). Also, an SFCI format 2 may be defined for transmission of the SL CSI (e.g., the SL CSI reporting from the receiver UE-2 to the transmitter UE-1). Also, an SFCI 3 may be defined for transmission of the SL HARQ-ACK and the SL CSI (e.g., the SL HARQ feedback and the SL CSI reporting from the receiver UE-2 to the transmitter UE-1). Also, an SFCI 4 may be defined for transmission of the SL HARQ-ACK and/or the SL CSI (e.g., the SL HARQ feedback and/or the SL CSI reporting from the UE 702 to the gNB 760). Namely, for the SL HARQ feedback to the transmitter UE-1 and the SL HARQ feedback to the gNB 760, different SCI format(s) may be defined. Also, for the SL CSI reporting to the transmitter UE-1 and the SL CSI reporting to the gNB 760, different SCI format(s) may be defined. Here, as described above, the SFCI 705 (i.e., SFCI format(s)) may be transmitted on the PSFCH.

For example, in a case that the SL HARQ feedback is enabled (e.g., for unicast), (e.g., in the case of non-CBG (i.e., Code Block Group) operation), the UE 702 may generate HARQ-ACK (e.g., a positive acknowledgment) if it successfully decodes the corresponding TB(s). Also, the UE 702 may generate HARQ-NACK (e.g., a negative acknowledgment) if it does not successfully decode the corresponding TB(s) after decoding the associated PSCCH targeted to the UE 702. Here, the gNB 760 may transmit to the UE 702, e.g., by using the RRC message, information used for indicating that whether the SL HARQ feedback is enabled or not.

For example, as the SL HARQ feedback, the UE 702 may transmit HARQ-NACK (e.g., a negative acknowledgment) on the PSFCH if it fails to decode the corresponding TB(s) after decoding the associated PSCCH, and transmit no signal on the PSFCH otherwise (e.g., if it successfully decodes the corresponding TB(s)). Also, as the SL HARQ feedback, the UE 702 may transmit HARQ-ACK (e.g., a positive acknowledgment) on the PSFCH if it successfully decodes the corresponding TB(s), and transmit HARQ-NACK (e.g., a negative acknowledgment) on the PSFCH if it does not successfully decode the corresponding TB(s) after decoding the associated PSCCH which targets the receiver UE-2.

Here, the HARQ feedback may be determined (e.g., defined) per resource pool 703 (e.g., Tx resource pool and/or Rx resource pool). For example, the number of the bits for the HARQ-ACK (e.g., a positive acknowledgment and/or a negative acknowledgment) may be determined per resource pool 703. The number of bits for the HARQ-ACK may be associated for the PSSCH transmission(s) on each resource pool 703 (e.g., within the single SL BWP 701). For each resource pool 703, the UE 702 may determine the number of bits for the HARQ-ACK, and perform the HARQ feedback.

Alternatively or additionally, the HARQ feedback may be determined (e.g., defined) per SL BWP 701. For example, the number of the bits for the HARQ-ACK (e.g., a positive acknowledgment and/or a negative acknowledgment) may be determined per SL BWP 701. The number of bits for the HARQ-ACK may be associated for the PSSCH transmission(s) on each SL BWP 701. For each SL BWP 701, the UE 702 may determine the number of bits for the HARQ-ACK, and perform the HARQ feedback.

Alternatively or additionally, the SL CSI reporting may be determined (e.g., defined) per resource pool 703 (e.g., Tx resource pool and/or Rx resource pool). For example, the number of the bits for the SL CSI may be determined per resource pool 703. The number of bits for the SL CSI may be associated for the PSSCH transmission(s) on each resource pool 703 (e.g., within the single SL BWP 701). For each resource pool 703, the UE 702 may determine the number of bits for the SL CSI, and perform the SL CSI reporting.

Alternatively or additionally, the SL CSI may be determined (e.g., defined) per SL BWP 701. For example, the number of the bits for the SL CSI may be determined per SL BWP 701. The number of bits for the SL CSI may be associated for the PSSCH transmission(s) on each SL BWP 701. For each SL BWP 701, the UE 702 may determine the number of bits for the SL CSI, and perform the SL CSI reporting.

For example, the SCSI-RS (e.g., a configuration(s) of the SCSI-RS) may be associated with the resource pool(s) 703

(e.g., Tx resource pool(s) and/or Rx resource pool(s)). For example, the configuration(s) of the SCSI-RS may be associates with a single resource pool 703. Namely, the SCSI-RS (e.g., the configuration(s)) of the SCSI-RS) may be associated with the index of resource pool(s) 703 (e.g., the index of Tx resource pool(s) 703 (i.e., Tx resource pool-id) and/or the index of Rx resource pool (i.e., Rx resource pool-id)). For example, the gNB 760 may transmit, by using the RRC message, information used for configuring the SCSI-RS (i.e., the configuration(s) of the SCSI-RS) associated with the index of the resource pool(s) 703. And, the UE 702 may calculate (e.g., acquire) the SL CSI based on the configuration(s) of the SCSI-RS, and perform the SL CSI reporting. For example, the UE 702 may calculate the SL CSI based on the configuration(s) of the SCSI-RS associated with the resource pool(s) 703, and perform the resource pool-based SL CSI reporting.

As described above, the SCI format(s) may include the information used for indicating the resource pool(s) 703 (e.g., Tx resource pool-id and/or Rx resource pool-id). For example, the SCI format 2, 3, and/or 4 may be include the information used for indicating the resource pool(s) 703. And, the information used for indicating the resource pool(s) 703 included in the SCI format(s) may be linked with (e.g., paired with, linked to) the resource pool(s) 703 associated with the configuration(s) of the SCSI-RS.

For example, in a case that a first configurations(s) of the SCSI-RS(s) associated with the resource pool(s) 703 (e.g., an eighth resource pool(s) 703) and the information used for indicating the resource pool(s) 703 (e.g., the eighth resource pool(s) 703) is included in the SCI format 2, the SCI format 2 may be used for indicating the presence of the SCSI-RS associated with the first configuration(s) of the SCSI-RS (e.g., in the slot(s) and/or the symbol(s)).

Also, in a case that a second configurations(s) of the SCSI-RS(s) associated with the resource pool(s) 703 (e.g., a ninth resource pool(s) 703) and the information used for indicating the resource pool(s) 703 (e.g., the ninth resource pool(s) 703) is included in the SCI format 3, the SCI format 3 may be used for requesting the SL CSI reporting based on the SCSI-RS associated with the second configuration(s) of the SCSI-RS(s) (i.e., the reporting of SL CSI calculated based on (e.g., by using) the second configuration(s) of the SCSI-RS(s)).

Also, in a case that a third configurations(s) of the SCSI-RS(s) associated with the resource pool(s) 703 (e.g., a tenth resource pool(s) 703) and the information used for indicating the resource pool(s) 703 (e.g., the tenth resource pool(s) 703) is included in the SCI format 4, the SCI format 4 may be used for requesting the transmission(s) of the SCSI-RS associated with the third configuration(s) of the SCSI-RS(s) (e.g., in the slot(s) and/or the symbol(s)).

Alternatively or additionally, the SCSI-RS (e.g., the configuration(s) of the SCSI-RS) may be associated with the SL BWP(s) 701. For example, the configuration(s) of the SCSI-RS may be associates with a single SL BWP 701. Namely, the SCSI-RS (e.g., the configuration(s)) of the SCSI-RS) may be associated with the index of SL BWP(s) 701 (e.g., the index of the SL BWP(s) 701 (i.e., bwp-id)). For example, the gNB 760 may transmit, by using the RRC message, information used for configuring the SCSI-RS (i.e., the configuration(s) of the SCSI-RS) associated with the index of the SL BWP(s) 701. And, the UE 702 may calculate (e.g., acquire) the SL CSI based on the configuration(s) of the SCSI-RS, and perform the SL CSI reporting. For example, the UE 702 may calculate the SL CSI based on the configuration(s) of the SCSI-RS associated with the SL BWP(s) 701, and perform the SL BWP-based SL CSI reporting.

As described above, the SCI format(s) may include the information used for indicating the SL BWP(s) 701 (e.g., bwp-id). For example, the SCI format 2, 3, and/or 4 may be include the information used for indicating the SL BWP(s) 701. And, the information used for indicating the SL BWP(s) 701 included in the SCI format(s) may be linked with (e.g., paired with, linked to) the SL BWP(s) 701 associated with the configuration(s) of the SCSI-RS.

For example, in a case that a fourth configurations(s) of the SCSI-RS(s) associated with the SL BWP(s) 701 (e.g., a first SL BWP(s) 701) and the information used for indicating the SL BWP(s) 701 (e.g., the first SL BWP(s) 701) is included in the SCI format 2, the SCI format 2 may be used for indicating the presence of the SCSI-RS associated with the fourth configuration(s) of the SCSI-RS (e.g., in the slot(s) and/or the symbol(s)).

Also, in a case that a fifth configurations(s) of the SCSI-RS(s) associated with the SL BWP(s) 701 (e.g., a second SL BWP(s) 701) and the information used for indicating the SL BWP(s) 701 (e.g., the second SL BWP(s) 701) is included in the SCI format 3, the SCI format 3 may be used for requesting the SL CSI reporting based on the SCSI-RS associated with the fifth configuration(s) of the SCSI-RS(s) (i.e., the reporting of SL CSI calculated based on (e.g., by using) the fifth configuration(s) of the SCSI-RS(s)).

Also, in a case that a sixth configurations(s) of the SCSI-RS(s) associated with the SL BWP(s) 701 (e.g., a third SL BWP(s) 701) and the information used for indicating the SL BWP(s) 701 (e.g., the third SL BWP(s) 701) is included in the SCI format 4, the SCI format 4 may be used for requesting the transmission(s) of the SCSI-RS associated with the sixth configuration(s) of the SCSI-RS(s) (e.g., in the slot(s) and/or the symbol(s)).

Here, the SCI format(s) (e.g., the SCI format(s) 0, 1, 2, 3, 4, 5, and/or 6) may include information used for identifying a linkage (e.g., a pairing) between the configuration(s) of the SCSI-RS(s) and the SCI format(s) (e.g., the content(s) of the SCI format(s)).

The information used for identifying the linkage between the configuration(s) of the SCI format(s) and the SCI format(s) may be information used for indicating the presence of the SCSI-RS (e.g., in the slot(s) and/or the symbol(s)). For example, the information used for indicating the presence of the SCSI-RS may be included in the SCI format 2. For example, more than one-bit information may be defined for the information used for indicating the presence of the SCSI-RS.

And, in a case that the "0" is set to the information used for indicating the present of the SCSI-RS, the SCSI-RS may not be present (e.g., in the slot(s) and/or the symbol(s)). Also, in a case that a value(s) other than "0" is set to the information used for indicating the presence of the SCSI-RS, the SCSI-RS may be present (e.g., in the slot(s) and/or the symbol(s)). Here, the configuration(s) of the SCSI-RS(s) may be associated with the value(s) of the information used for indicating the presence of the SCSI-RS. Here, the value(s) may be referred as a state(s) (e.g., a state(s) of the indication of the presence of the SCSI-RS(s)).

For example, in a case that a seventh configurations(s) of the SCSI-RS(s) is associated with the state of the indication of the presence of the SCSI-RS(s) (e.g., a value "01" of 2-bit information) and the information used for indicating the presence of the SCSI-RS(s) (e.g., 2-bit information) is set to the value "01", the SCSI-RS associated with the seventh configuration(s) of the SCSI-RS may be present (e.g., in the slot(s) and/or the symbol(s)). Here, as described above, the seventh configuration(s) of the SCSI-RS(s) may be associated with the resource pool(s) 703 and/or the SL BWP(s) 701. Namely, the UE 702 may identify the configuration(s) of the SCSI-RS(s) based on the state(s) of the information used for indicating the presence of the SCSI-RS(s) (e.g., the information used for indicating the linkage between the configuration(s) of the SCSI-RS and the SCI format(s)).

Also, the information used for identifying the linkage between the configuration(s) of the SCI format(s) may be information used for requesting the SL CSI reporting (e.g., SL CSI request field). For example, the information used for requesting the SL CSI reporting may be included in the SCI format 3. For example, more than one-bit information may be defined for the information used for requesting the SL CSI reporting.

And, in a case that the "0" is set to the information used for requesting the SL CSI reporting, the SL CSI reporting may not be requested. Also, in a case that a value(s) other than "0" is set to the information used for requesting the SL CSI reporting, the SL CSI reporting may be requested. Here, the configuration(s) of the SCSI-RS(s) may be associated with the value(s) of the information used for requesting the SL CSI reporting. Here, the value(s) may be referred as a state(s) (e.g., a state(s) of a triggering of the SL CSI reporting, a triggering state of the SL CSI reporting).

For example, in a case that an eighth configurations(s) of the SCSI-RS(s) is associated with the triggering state of the SL CSI reporting (e.g., a value "01" of 2-bit information) and the information used for requesting the SL CSI reporting (e.g., 2-bit information) is set to the value "01", the SL CSI reporting associated with the eighth configuration(s) of the SCSI-RS(s) may be requested. For example, the SL CSI reporting based on (e.g., calculated by using) the eighth configuration of the SCSI-RS(s) may be requested. Here, as described above, the eighth configuration(s) of the SCSI-RS(s) may be associated with the resource pool(s) 703 and/or the SL BWP(s) 701. Namely, the UE 702 may identify the configuration(s) of the SCSI-RS(s) based on the triggering state(s) of the information used for requesting the SL CSI reporting (e.g., the information used for indicating the linkage between the configuration(s) of the SCSI-RS and the SCI format(s)).

Also, the information used for identifying the linkage between the configuration(s) of the SCI format(s) may be information used for requesting the transmission(s) of the SCSI-RS(s) (e.g., SCSI-RS request field). For example, the information used for requesting the transmission(s) of the SCSI-RS(s) may be included in the SCI format 4. For example, more than one-bit information may be defined for the information used for requesting the SL CSI reporting.

And, in a case that the "0" is set to the information used for requesting the transmission(s) of the SCSI-RS(s), the transmission(s) of the SCSI-RS(s) may not be requested. Also, in a case that a value(s) other than "0" is set to the information used for requesting the transmission(s) of the SCSI-RS(s), the transmission(s) of the SCSI-RS(s) may be requested. Here, the configuration(s) of the SCSI-RS(s) may be associated with the value(s) of the information used for requesting the transmission(s) of the SCSI-RS(s). Here, the value(s) may be referred as a state(s) (e.g., a state(s) of a triggering of the SCSI-RS transmission, a triggering state of the SCSI-RS transmission).

For example, in a case that a ninth configurations(s) of the SCSI-RS(s) is associated with the triggering state of the SCSI-RS transmission (e.g., a value "01" of 2-bit information) and the information used for requesting the SCSI-RS transmission (e.g., 2-bit information) is set to the value "01", the SCSI-RS transmission(s) associated with the ninth configuration(s) of the SCSI-RS(s) may be requested. For example, the SCSI-RS transmission based on the ninth configuration(s) of the SCSI-RS(s) may be requested. Here, as described above, the ninth configuration(s) of the SCSI-RS(s) may be associated with the resource pool(s) 703 and/or the SL BWP(s) 701. Namely, the UE 702 may identify the configuration(s) of the SCSI-RS(s) based on the triggering state(s) of the information used for requesting the SCSI-RS transmission (e.g., the information used for indicating the linkage between the configuration(s) of the SCSI-RS and the SCI format(s)).

Here, the first, the second, the third, the fourth, the fifth, the sixth, the seventh, the eighth, the ninth, and/or the tenth resource pool(s) 703 may be the same and/or different.

Also, the first, the second, the third, the fourth, the fifth, the sixth, the seventh, the eighth, and/or the ninth configuration(s) of the SCSI-RS(s) may be the same and/or different.

Also, the first, the second, and/or the third SL BWP(s) 701 may be the same and/or different.

Figure 8:
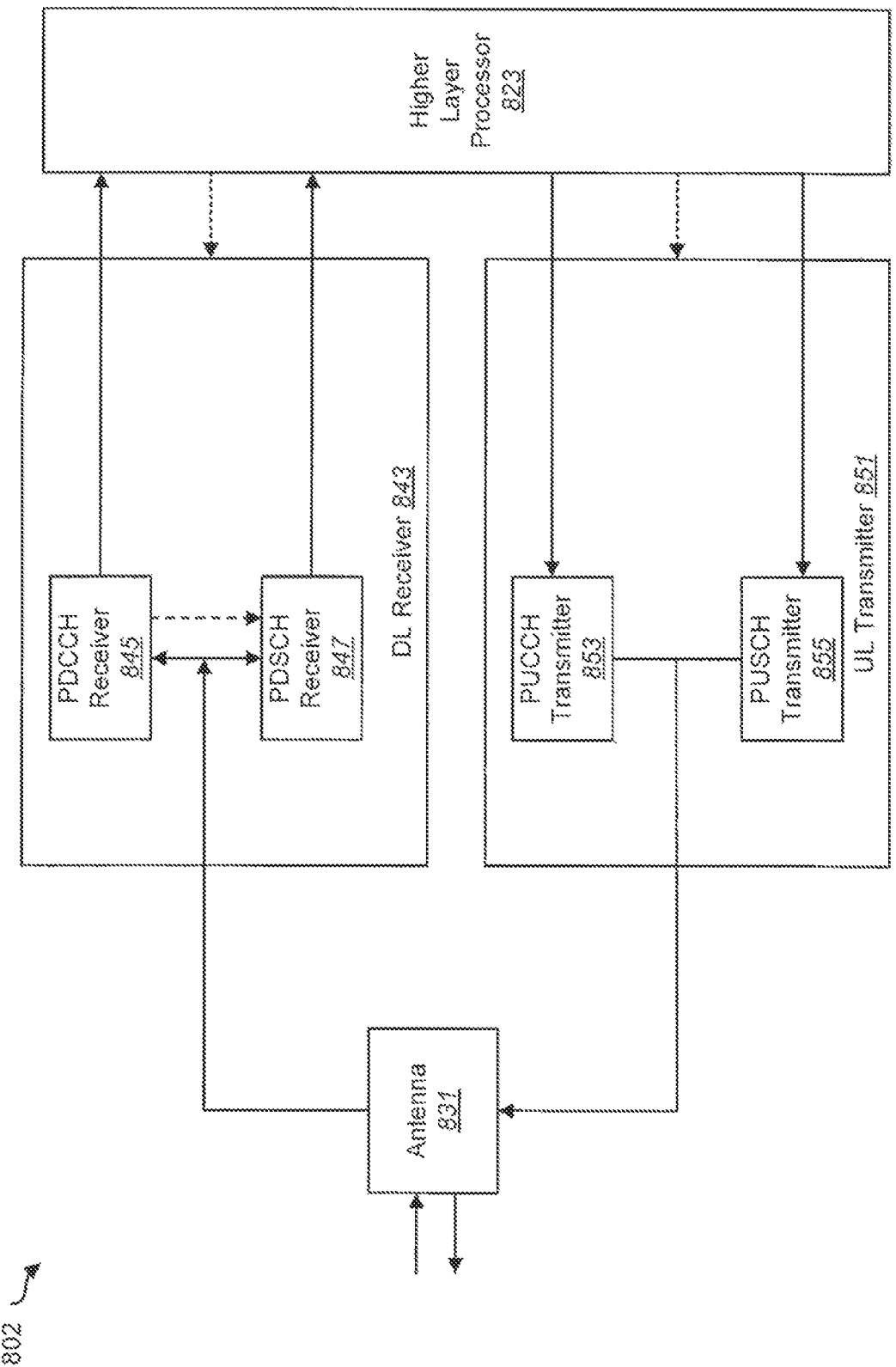
FIG. 8 is a block diagram illustrating one implementation of a UE.

FIG. 8 is a block diagram illustrating one implementation of a UE 802. The UE 802 may include a higher layer processor 823, a UL transmitter 851, a DL receiver 843, and one or more antenna 831. The UL transmitter 851 may include a PUCCH transmitter 853 and a PUSCH transmitter 855. The DL receiver 843 may include a PDCCH receiver 845 and a PDSCH receiver 847.

The higher layer processor 823 may manage physical layer's behaviors (the UL transmitter's and the DL receiver's behaviors) and provide higher layer parameters to the physical layer. The higher layer processor 823 may obtain transport blocks from the physical layer. The higher layer processor 823 may send/acquire higher layer messages such as an RRC message and MAC message to/from a UE's higher layer. The higher layer processor 823 may provide the PUSCH transmitter transport blocks and provide the PUCCH transmitter 853 UCI.

The DL receiver 843 may receive multiplexed downlink physical channels and downlink physical signals via receiving antennas 831 and de-multiplex them. The PDCCH receiver 845 may provide the higher layer processor 823 DCI. The PDSCH receiver 847 may provide the higher layer processor 823 received transport blocks.

Figure 9:
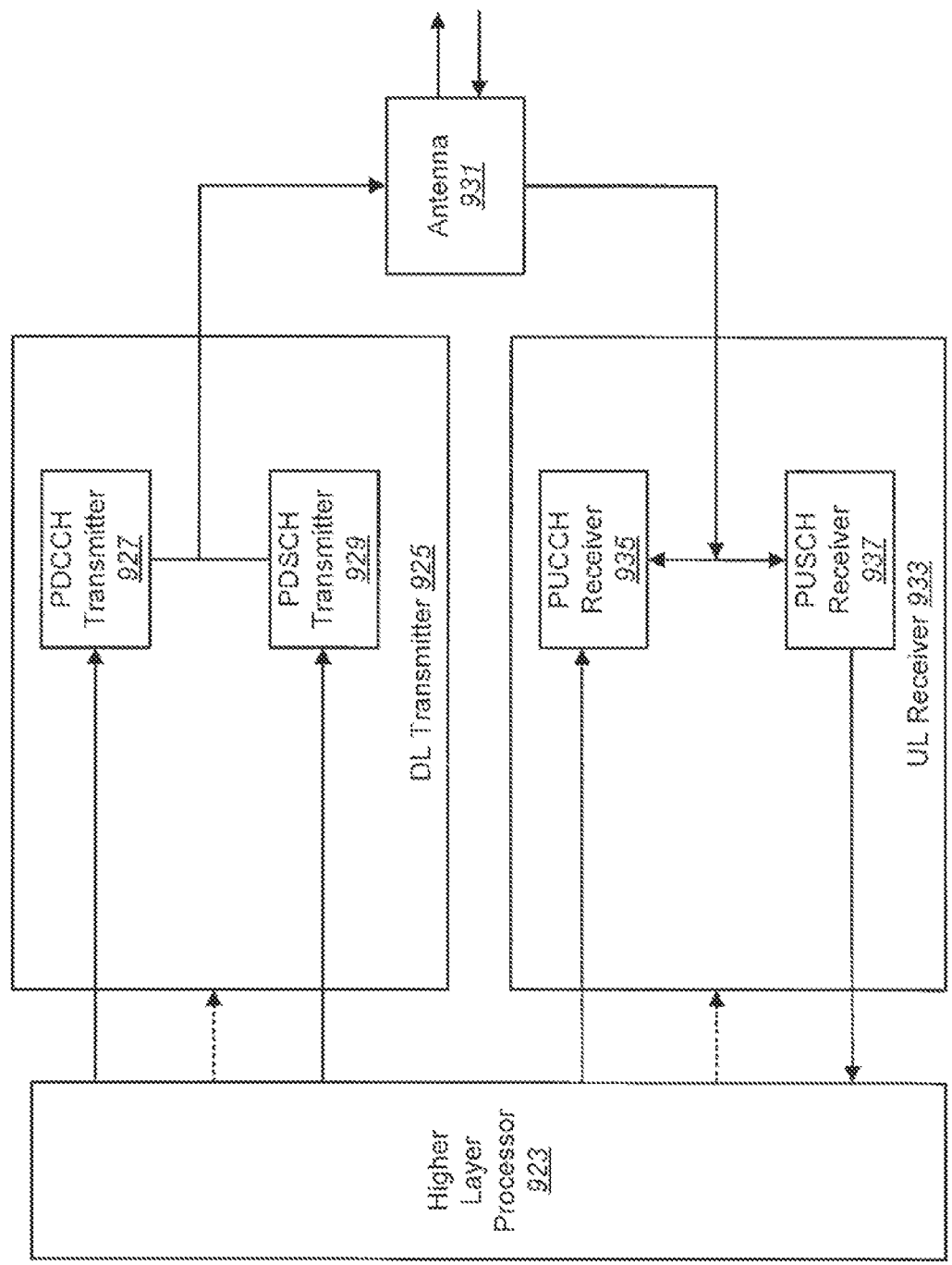
FIG. 9 is a block diagram illustrating one implementation of a base station (e.g., gNB).

FIG. 9 is a block diagram illustrating one implementation of a gNB 960. The gNB 960 may include a higher layer processor 923, a DL transmitter 925, a UL receiver 933, and one or more antenna 931. The DL transmitter 925 may include a PDCCH transmitter 927 and a PDSCH transmitter 929. The UL receiver 933 may include a PUCCH receiver 935 and a PUSCH receiver 937.

The higher layer processor 923 may manage physical layer's behaviors (the DL transmitter's and the UL receiver's behaviors) and provide higher layer parameters to the physical layer. The higher layer processor 923 may obtain transport blocks from the physical layer. The higher layer processor 923 may send/acquire higher layer messages such as an RRC message and MAC message to/from a UE's higher layer. The higher layer processor 923 may provide the PDSCH transmitter transport blocks and provide the PDCCH transmitter transmission parameters related to the transport blocks.

The DL transmitter 925 may multiplex downlink physical channels and downlink physical signals (including reservation signal) and transmit them via transmission antennas 931. The UL receiver 933 may receive multiplexed uplink physical channels and uplink physical signals via receiving antennas 931 and de-multiplex them. The PUCCH receiver 935 may provide the higher layer processor 923 UCI. The PUSCH receiver 937 may provide the higher layer processor 923 received transport blocks.

Figure 10:
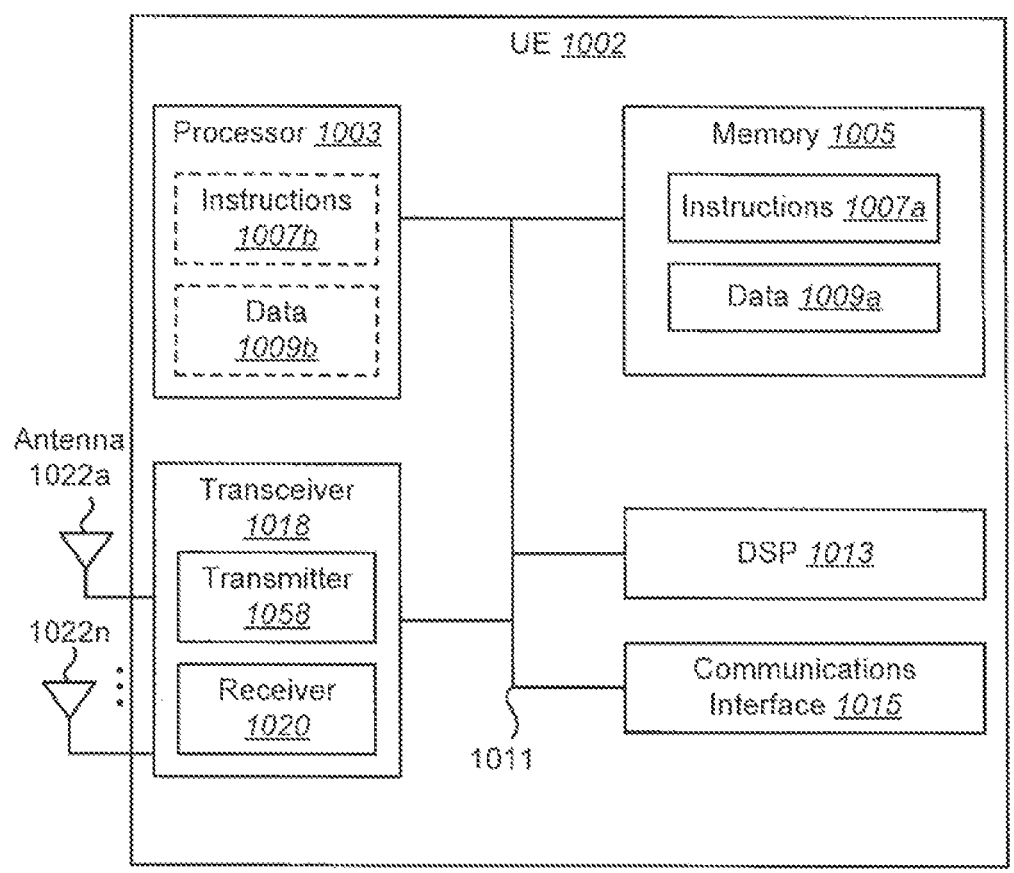
FIG. 10 illustrates various components that may be utilized in a UE.

FIG. 10 illustrates various components that may be utilized in a UE 1002. The UE 1002 described in connection with FIG. 10 may be implemented in accordance with the UE 102 described in connection with FIG. 1. The UE 1002 includes a processor 1003 that controls operation of the UE 1002. The processor 1003 may also be referred to as a central processing unit (CPU). Memory 1005, which may include read-only memory (ROM), random access memory (RAM), a combination of the two or any type of device that may store information, provides instructions 1007a and data 1009a to the processor 1003. A portion of the memory 1005 may also include non-volatile random-access memory (NVRAM). Instructions 1007b and data 1009b may also reside in the processor 1003. Instructions 1007b and/or data 1009b loaded into the processor 1003 may also include instructions 1007a and/or data 1009a from memory 1005 that were loaded for execution or processing by the processor 1003. The instructions 1007b may be executed by the processor 1003 to implement the methods described above.

The UE 1002 may also include a housing that contains one or more transmitters 1058 and one or more receivers 1020 to allow transmission and reception of data. The transmitter(s) 1058 and receiver(s) 1020 may be combined into one or more transceivers 1018. One or more antennas 1022a-n are attached to the housing and electrically coupled to the transceiver 1018.

The various components of the UE 1002 are coupled together by a bus system 1011, which may include a power bus, a control signal bus and a status signal bus, in addition to a data bus. However, for the sake of clarity, the various buses are illustrated in FIG. 10 as the bus system 1011. The UE 1002 may also include a digital signal processor (DSP) 1013 for use in processing signals. The UE 1002 may also include a communications interface 1015 that provides user access to the functions of the UE 1002. The UE 1002 illustrated in FIG. 10 is a functional block diagram rather than a listing of specific components.

Figure 11:
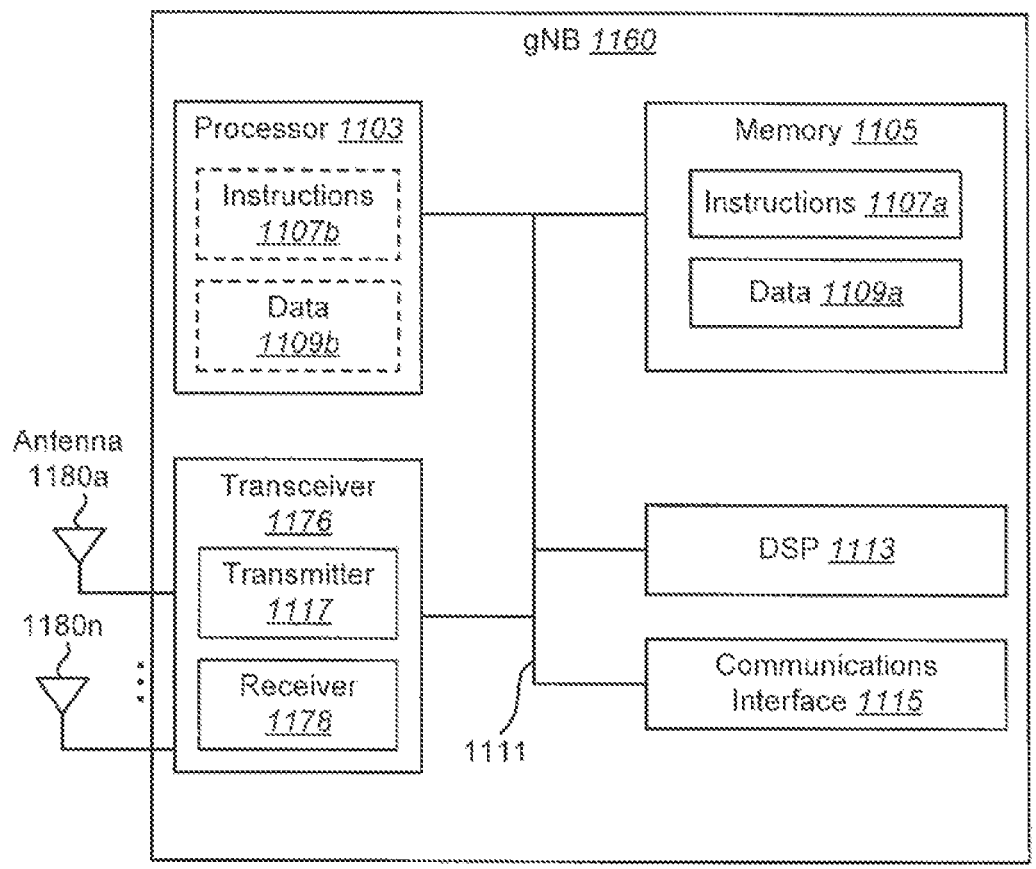
FIG. 11 illustrates various components that may be utilized in a base station (e.g., gNB).

FIG. 11 illustrates various components that may be utilized in a gNB 1160. The gNB 1160 described in connection with FIG. 11 may be implemented in accordance with the gNB 160 described in connection with FIG. 1. The gNB 1160 includes a processor 1103 that controls operation of the gNB 1160. The processor 1103 may also be referred to as a central processing unit (CPU). Memory 1105, which may include read-only memory (ROM), random access memory (RAM), a combination of the two or any type of device that may store information, provides instructions 1107a and data 1109a to the processor 1103. A portion of the memory 1105 may also include non-volatile random-access memory (NVRAM). Instructions 1107b and data 1109b may also reside in the processor 1103. Instructions 1107b and/or data 1109b loaded into the processor 1103 may also include instructions 1107a and/or data 1109a from memory 1105 that were loaded for execution or processing by the processor 1103. The instructions 1107b may be executed by the processor 1103 to implement the methods described above.

The gNB 1160 may also include a housing that contains one or more transmitters 1117 and one or more receivers 1178 to allow transmission and reception of data. The transmitter(s) 1117 and receiver(s) 1178 may be combined into one or more transceivers 1176. One or more antennas 1180a-n are attached to the housing and electrically coupled to the transceiver 1176.

The various components of the gNB 1160 are coupled together by a bus system 1111, which may include a power bus, a control signal bus and a status signal bus, in addition to a data bus. However, for the sake of clarity, the various buses are illustrated in FIG. 11 as the bus system 1111. The gNB 1160 may also include a digital signal processor (DSP) 1113 for use in processing signals. The gNB 1160 may also include a communications interface 1115 that provides user access to the functions of the gNB 1160. The gNB 1160 illustrated in FIG. 11 is a functional block diagram rather than a listing of specific components.

Figure 12:
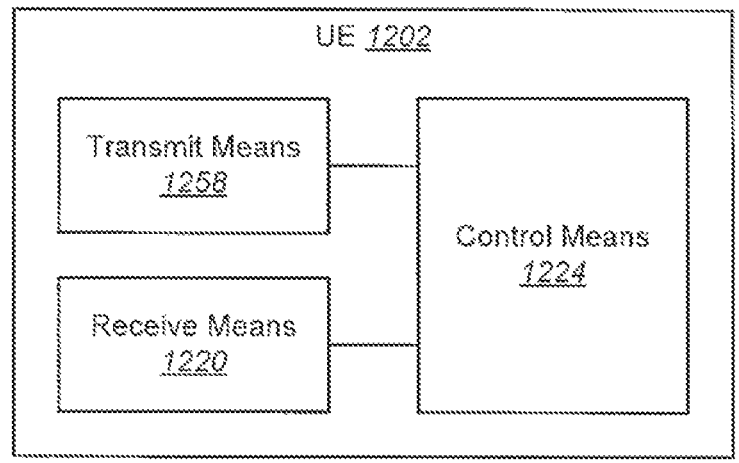
FIG. 12 is a block diagram illustrating one implementation of a UE in which configurations for V2X communication may be implemented.

FIG. 12 is a block diagram illustrating one implementation of a UE 1202 in which configurations for V2X communication may be implemented. The UE 1202 includes transmit means 1258, receive means 1220 and control means 1224. The transmit means 1258, receive means 1220 and control means 1224 may be configured to perform one or more of the functions described in connection with FIG. 1 above. FIG. 10 above illustrates one example of a concrete apparatus structure of FIG. 12. Other various structures may be implemented to realize one or more of the functions of FIG. 1. For example, a DSP may be realized by software.

Figure 13:
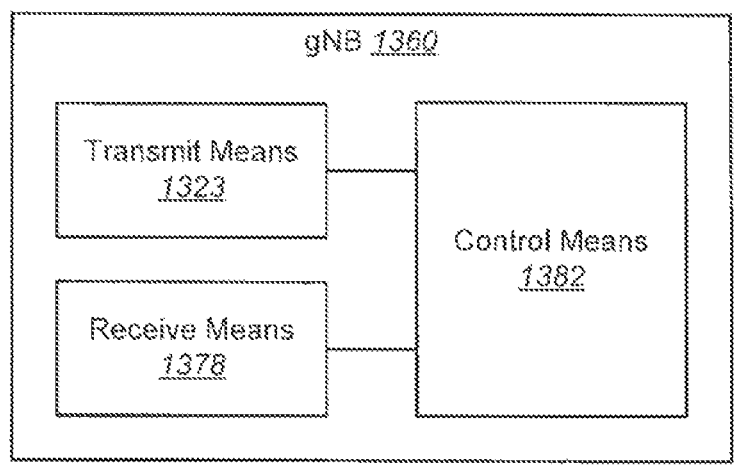
FIG. 13 is a block diagram illustrating one implementation of a base station (e.g., gNB) in which configurations for V2X communication may be implemented.

FIG. 13 is a block diagram illustrating one implementation of a gNB 1360 in which configurations for V2X communication may be implemented. The gNB 1360 includes transmit means 1323, receive means 1378 and control means 1382. The transmit means 1323, receive means 1378 and control means 1382 may be configured to perform one or more of the functions described in connection with FIG. 1 above. FIG. 11 above illustrates one example of a concrete apparatus structure of FIG. 13. Other various structures may be implemented to realize one or more of the functions of FIG. 1. For example, a DSP may be realized by software.

Figure 14:
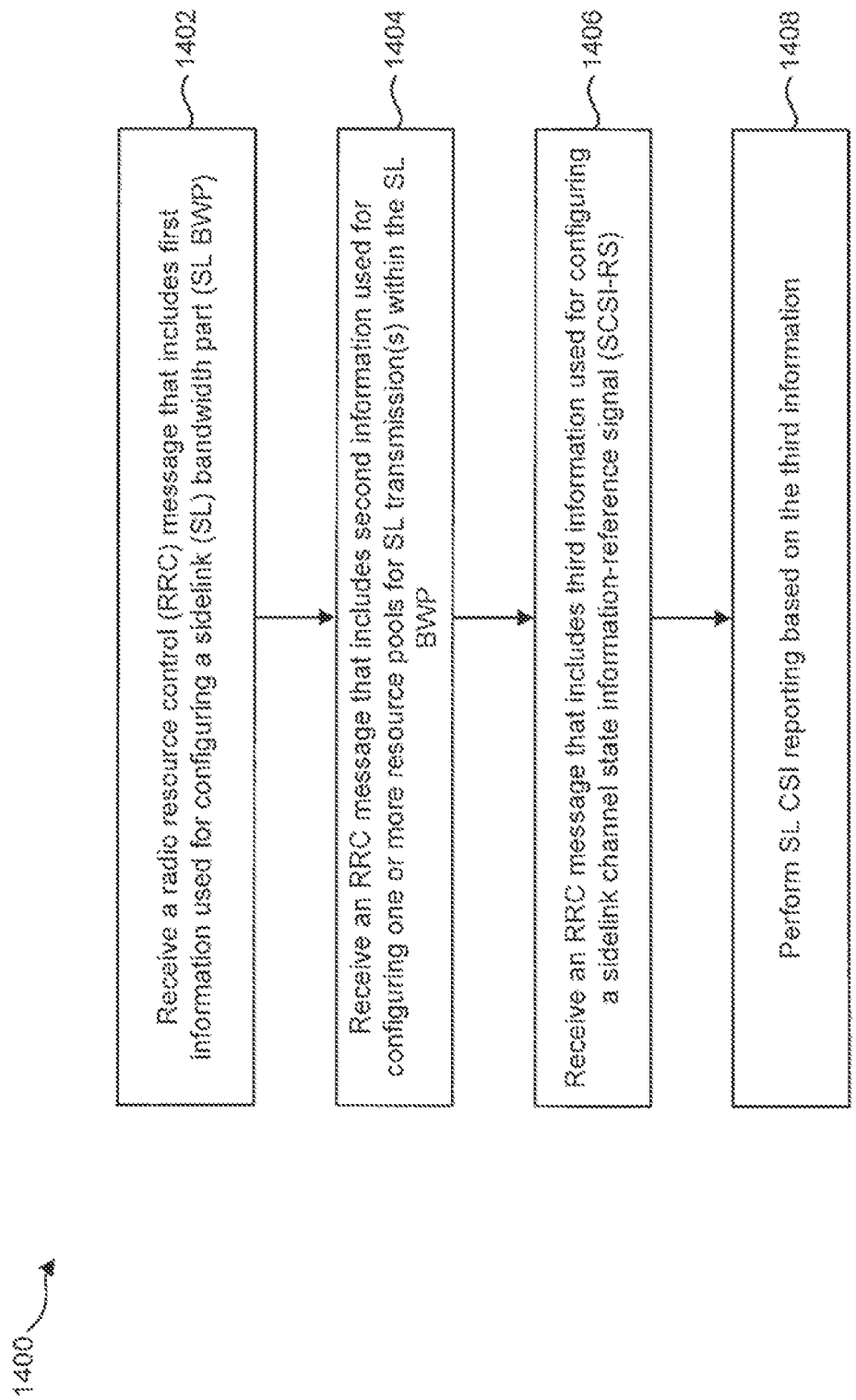
FIG. 14 is a flow diagram illustrating a communication method of a UE that performs an SL communication(s).

FIG. 14 is a flow diagram illustrating a communication method 1400 of a user equipment (UE) 102 that performs a sidelink (SL) communication(s). The UE 102 may receive 1402 a radio resource control (RRC) message that includes first information used for configuring a SL bandwidth part (SL BWP). The UE 102 may receive 1404 an RRC message that includes second information used for configuring one or more resource pools for SL transmission(s) within the SL BWP. The UE 102 may receive 1406 an RRC message that includes third information used for configuring a sidelink channel state information-reference signal (SCSI-RS). The UE 102 may perform 1408 SL CSI reporting based on the third information. The third information may be associated with the SL BWP and/or one resource pool of the one or more resource pools for the SL transmission(s).

Figure 15:
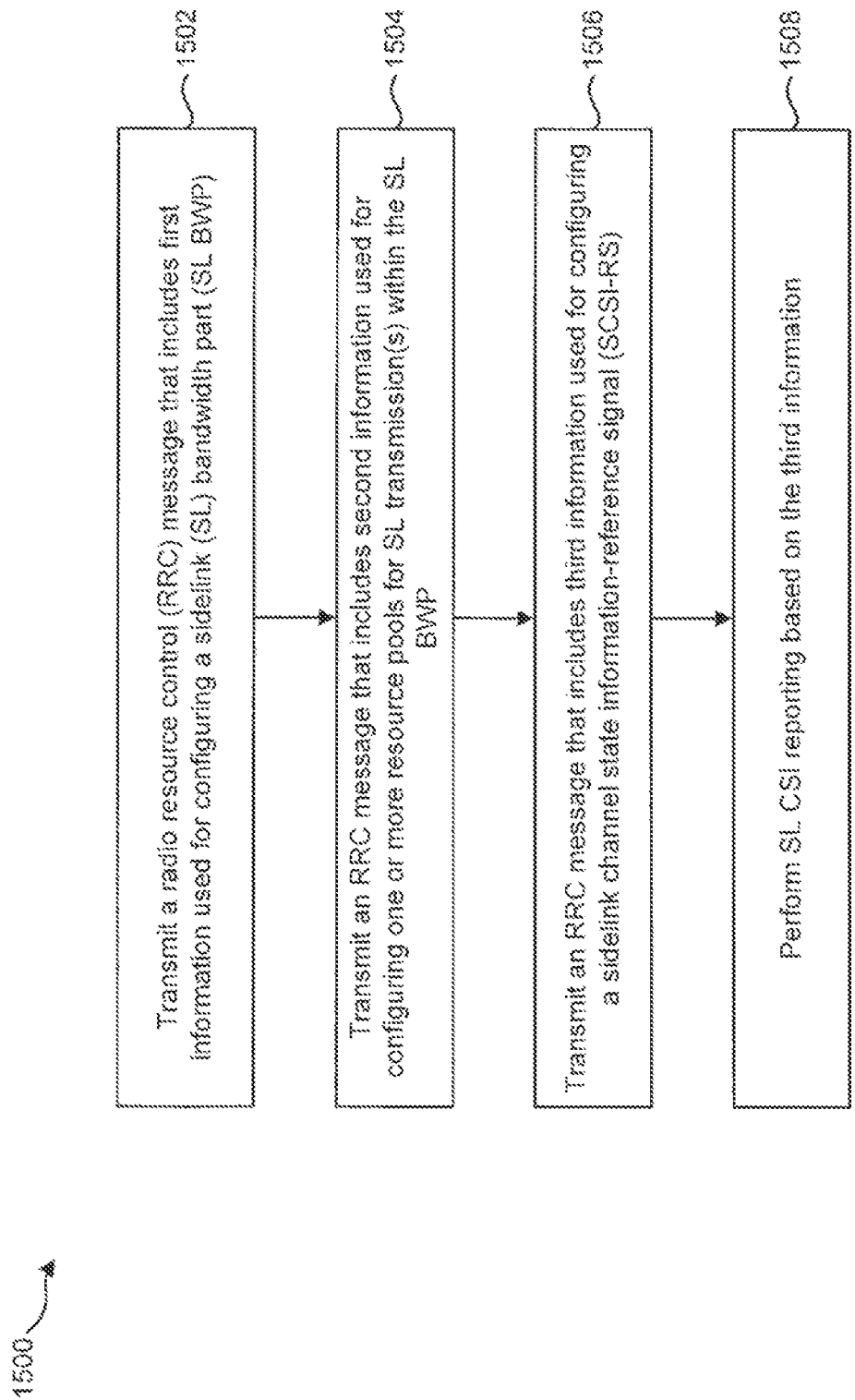
FIG. 15 is a flow diagram illustrating a communication method of a base station (e.g., gNB).

FIG. 15 is a flow diagram illustrating a communication method 1500 of a base station apparatus (gNB) 160. The gNB 160 may transmit 1502 a radio resource control (RRC) message that includes first information used for configuring a SL bandwidth part (SL BWP). The gNB 160 may transmit 1504 an RRC message that includes second information used for configuring one or more resource pools for SL transmission(s) within the SL BWP. The gNB 160 may transmit 1506 an RRC message that includes third information used for configuring sidelink channel state information-reference signal (SCSI-RS). SL CSI reporting may be performed 1508 based on the third information. The third information may be associated with the SL BWP and/or one resource pool of the one or more resource pools for the SL transmission(s).

It should be noted that names of physical channels described herein are examples. The other names such as "NRPDCCH, NRPDSCH, NRPUCCH and NRPDSCH", "new Generation-(G)PDCCH, GPDSCH, GPUCCH and GPUSCH" or the like can be used.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any oilier medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

A program running on the gNB 160 or the UE 102 according to the described systems and methods is a program (a program for causing a computer to operate) that controls a CPU and the like in such a manner as to realize the function according to the described systems and methods. Then, the information that is handled in these apparatuses is temporarily stored in a RAM while being processed. Thereafter, the information is stored in various ROMs or HDDs, and whenever necessary, is read by the CPU to be modified or written. As a recording medium on which the program is stored, among a semiconductor (for example, a ROM, a nonvolatile memory card, and the like), an optical storage medium (for example, a DVD, a MO, a MD, a CD, a BD, and the like), a magnetic storage medium (for example, a magnetic tape, a flexible disk, and the like), and the like, any one may be possible. Furthermore, in some cases, the function according to the described systems and methods described above is realized by running the loaded program, and in addition, the function according to the described systems and methods is realized in conjunction with an operating system or other application programs, based on an instruction from the program.

Furthermore, in a case where the programs are available on the market, the program stored on a portable recording medium can be distributed or the program can be transmitted to a server computer that connects through a network such as the Internet. In this case, a storage device in the server computer also is included. Furthermore, some or all of the gNB 160 and the UE 102 according to the systems and methods described above may be realized as an LSI that is a typical integrated circuit. Each functional block of the gNB 160 and the UE 102 may be individually built into a chip, and some or all functional blocks may be integrated into a chip. Furthermore, a technique of the integrated circuit is not limited to the LSI, and an integrated circuit for the functional block may be realized with a dedicated circuit or a general-purpose processor. Furthermore, if with advances in a semiconductor technology, a technology of an integrated circuit that substitutes for the LSI appears, it is also possible to use an integrated circuit to which the technology applies.

Moreover, each functional block or various features of the base station device and the terminal device used in each of the aforementioned implementations may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

As used herein, the term "and/or" should be interpreted to mean one or more items. For example, the phrase "A, B and/or C" should be interpreted to mean any of: only A, only B, only C, A and B (but not C), B and C (but not A), A and C (but not B), or all of A, B, and C. As used herein, the phrase "at least one of" should be interpreted to mean one or more items. For example, the phrase "at least one of A, B and C" or the phrase "at least one of A, B or C" should be interpreted to mean any of: only A, only B, only C, A and B (but not C), B and C (but not A), A and C (but not B), or all of A, B, and C. As used herein, the phrase "one or more of" should be interpreted to mean one or more items. For example, the phrase "one or more of A, B and C" or the phrase "one or more of A, B or C" should be interpreted to mean any of: only A, only B, only C, A and B (but not C), B and C (but not A), A and C (but not B), or all of A, B, and C.

The invention claimed is:

1. A user equipment (UE) that performs sidelink (SL) communications, the UE comprising:
   receiving circuitry configured to:
      receive a first radio resource control (RRC) message comprising first information used for configuring an SL bandwidth part (BWP);

receive a second RRC message comprising second information used for configuring one or more resource pools for SL transmission within the SL BWP; and receive a third RRC message comprising third information used for configuring a sidelink channel state information (SCSI)-reference signal (RS); and transmitting circuitry configured to perform SL channel state information (CSI) reporting based on the third information, wherein the third information is associated with at least one of the SL BWP and one resource pool of the one or more resource pools for the SL transmission.

2. A base station apparatus, comprising:
transmitting circuitry configured to:
  transmit a first radio resource control (RRC) message comprising first information used for configuring a sidelink (SL) bandwidth part (BWP);
  transmit a second RRC message comprising second information used for configuring one or more resource pools for SL transmission within the SL BWP; and
  transmit a third RRC message comprising third information used for configuring a sidelink channel state information (SCSI)-reference signal (RS), wherein;
SL channel state information (CSI) reporting is performed based on the third information, and
the third information is associated with at least one of the SL BWP and one resource pool of the one or more resource pools for the SL transmission.

3. A communication method performed by a user equipment for performing sidelink (SL) communications, the communication method comprising:

receiving a first radio resource control (RRC) message comprising first information used for configuring an SL bandwidth part (BWP);

receiving a second RRC message comprising second information used for configuring one or more resource pools for SL transmission within the SL BWP;

receiving a third RRC message comprising third information used for configuring a sidelink channel state information (SCSI)-reference signal (RS); and performing SL channel state information (CSI) reporting based on the third information, wherein the third information is associated with at least one of the SL BWP and one resource pool of the one or more resource pools for the SL transmission.

4. A communication method performed by a base station apparatus, the communication method comprising:
  transmitting a first radio resource control (RRC) message comprising first information used for configuring a sidelink (SL) bandwidth part (BWP);
  transmitting a second RRC message comprising second information used for configuring one or more resource pools for SL transmission within the SL BWP; and
  transmitting a third RRC message comprising third information used for configuring a sidelink channel state information (SCSI)-reference signal (RS), wherein:
SL channel state information (CSI) reporting is performed based on the third information, and
the third information is associated with at least one of the SL BWP and one resource pool of the one or more resource pools for the SL transmission.

* * * * *